US012593238B2

(12) United States Patent
Reddy et al.

(10) Patent No.: US 12,593,238 B2
(45) Date of Patent: ***Mar. 31, 2026

(54) FRONTHAUL LINK SELECTION IN WIRELESS COMMUNICATIONS SYSTEMS

(71) Applicant: Altiostar Networks, Inc., Tewksbury, MA (US)

(72) Inventors: M Ramana Reddy, Bangalore (IN); Sridhar Bhaskaran, Bengaluru (IN)

(73) Assignee: Altiostar Networks, Inc., Tewksbury, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/413,121

(22) Filed: Jan. 16, 2024

(65) Prior Publication Data

US 2024/0155411 A1     May 9, 2024

Related U.S. Application Data

(63) Continuation of application No. 17/403,419, filed on Aug. 16, 2021, now Pat. No. 11,917,447.

(51) Int. Cl.
*H04B 17/10*          (2015.01)
*H04B 17/364*        (2015.01)
(Continued)

(52) U.S. Cl.
CPC ...... *H04W 28/0247* (2013.01); *H04B 17/104* (2015.01); *H04B 17/364* (2015.01);
(Continued)

(58) Field of Classification Search
CPC ... H04B 7/02–12; H04B 17/0082–3913; H04J 3/02–26; H04L 5/0001–26;
(Continued)

(56) References Cited

U.S. PATENT DOCUMENTS 11,917,447 B2 * 2/2024 Reddy .............. H04W 28/0247
2009/0310509 A1 12/2009 Kumai
(Continued)

FOREIGN PATENT DOCUMENTS

JP      2008-5458 A      1/2008
JP      2013-21689 A     1/2013
(Continued)

OTHER PUBLICATIONS

International Search Report and Written Opinion for International Patent Application No. PCT/US2022/036813 mailed Nov. 22, 2022.

*Primary Examiner* — Timothy J Weidner
(74) *Attorney, Agent, or Firm* — Sughrue Mion, PLLC

(57)      ABSTRACT

A method, a system, and a computer program product for selecting fronthaul links in a wireless communication system. One or more link delays are determined. The link delays are associated with one or more communication links in the plurality of communication links communicatively coupling a first communication device and a second communication device. Using the determined link delays, a communication link transmission priority of the communication links for transmission of one or more data packets is determined. A listing of prioritized communication links is generated. At least one communication link in the prioritized communication links is selected for transmission of data packets between the first and second communication devices. Using the selected communication link, the data packets are transmitted between the first and second communication devices.

10 Claims, 19 Drawing Sheets

(51) Int. Cl.

| | |
|---|---|
| *H04L 5/00* | (2006.01) |
| *H04L 43/0852* | (2022.01) |
| *H04L 43/16* | (2022.01) |
| *H04W 24/10* | (2009.01) |
| *H04W 28/02* | (2009.01) |
| *H04W 28/08* | (2023.01) |
| *H04W 72/542* | (2023.01) |
| *H04W 72/56* | (2023.01) |
| *H04W 84/02* | (2009.01) |
| *H04W 88/08* | (2009.01) |
| *H04W 88/12* | (2009.01) |
| *H04W 92/02* | (2009.01) |
| *H04W 92/12* | (2009.01) |
| *H04W 92/20* | (2009.01) |

(52) U.S. Cl.
CPC ............ *H04L 5/003* (2013.01); *H04L 5/0094* (2013.01); *H04L 43/0852* (2013.01); *H04L 43/16* (2013.01); *H04W 24/10* (2013.01); *H04W 28/0236* (2013.01); *H04W 28/0835* (2020.05); *H04W 28/0942* (2020.05); *H04W 72/542* (2023.01); *H04W 72/56* (2023.01); *H04W 84/02* (2013.01); *H04W 88/085* (2013.01); *H04W 88/12* (2013.01); *H04W 92/02* (2013.01); *H04W 92/12* (2013.01); *H04W 92/20* (2013.01)

(58) Field of Classification Search
CPC ......... H04L 27/26–30; H04L 43/02–55; H04L 45/02–851; H04W 8/22–245; H04W 16/02–32; H04W 24/02–10; H04W 28/02–26; H04W 36/0005–385; H04W 40/005–38; H04W 48/02–20; H04W 56/0005–0095; H04W 72/02–569; H04W 74/002–0891; H04W 84/005–22; H04W 88/005–188; H04W 92/02–24
See application file for complete search history.

(56) References Cited

U.S. PATENT DOCUMENTS

| | | | | |
|---|---|---|---|---|
| 2014/0233479 | A1 | 8/2014 | Dahod et al. | |
| 2019/0075577 | A1 | 3/2019 | Ode et al. | |
| 2019/0356403 | A1 * | 11/2019 | V.K. ..................... | H04L 45/245 |
| 2020/0112879 | A1 * | 4/2020 | Shimoda .............. | H04W 28/06 |
| 2020/0178089 | A1 | 6/2020 | Sevindik | |
| 2021/0126760 | A1 * | 4/2021 | Lee ....................... | H04W 72/20 |
| 2021/0243797 | A1 | 8/2021 | Reddy | |

FOREIGN PATENT DOCUMENTS

| | | | | |
|---|---|---|---|---|
| JP | 2015-523778 | A | 8/2015 | |
| JP | 2019-9588 | A | 1/2019 | |
| JP | 2020-136788 | A | 8/2020 | |
| WO | WO-2020151800 | A1 * | 7/2020 | ........ H04W 28/0289 |
| WO | 2021158665 | A1 | 8/2021 | |

* cited by examiner

305 Backhaul vBBU-High

Figure 3:
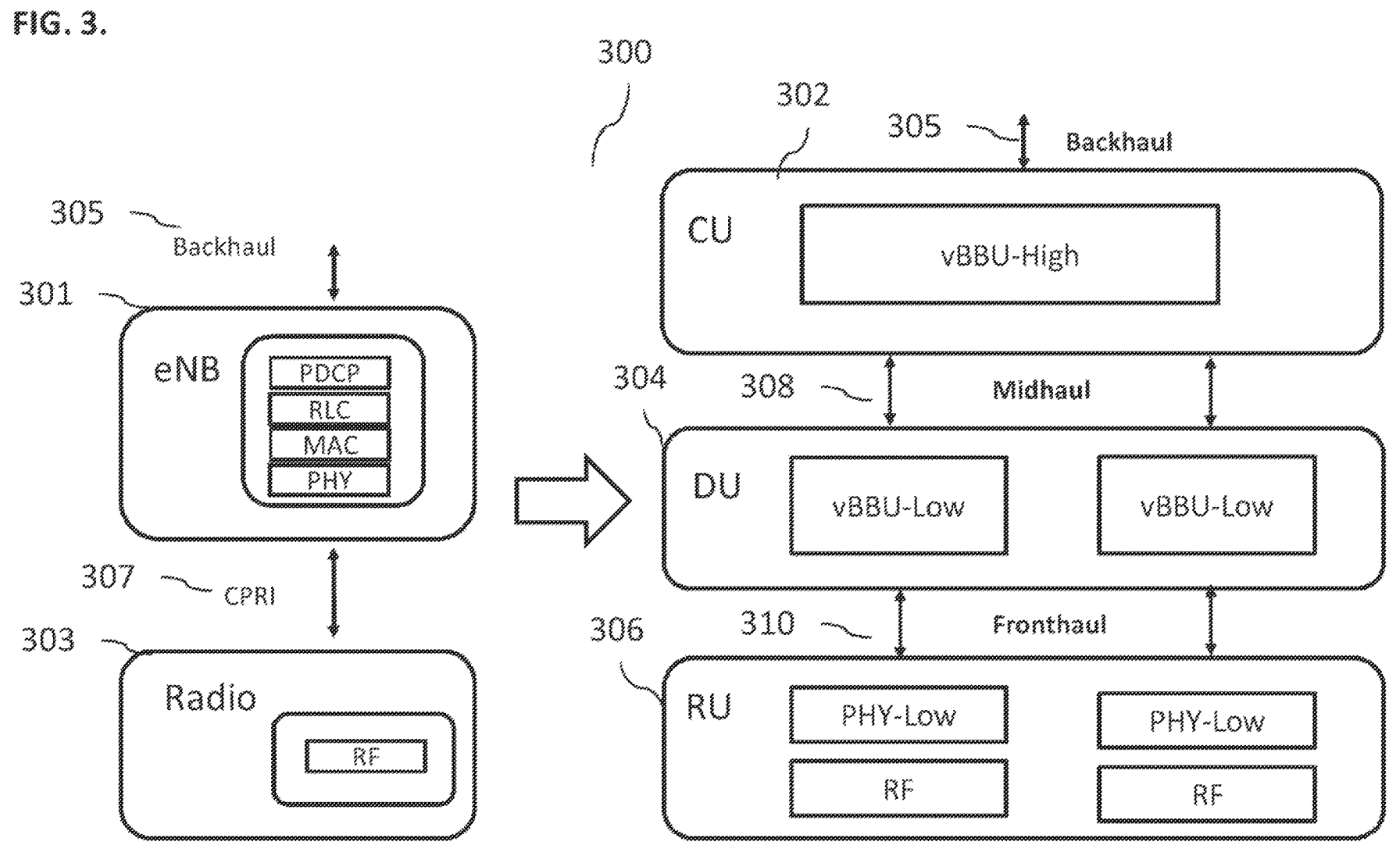

304 DU

308 Midhaul vBBU-Low vBBU-Low

306 RU

310 Fronthaul

PHY-Low

RF

PHY-Low

RF 301 eNB

305 Backhaul

PDCP

RLC

MAC

PHY

303 Radio

307 CPRI

Figure 6C:
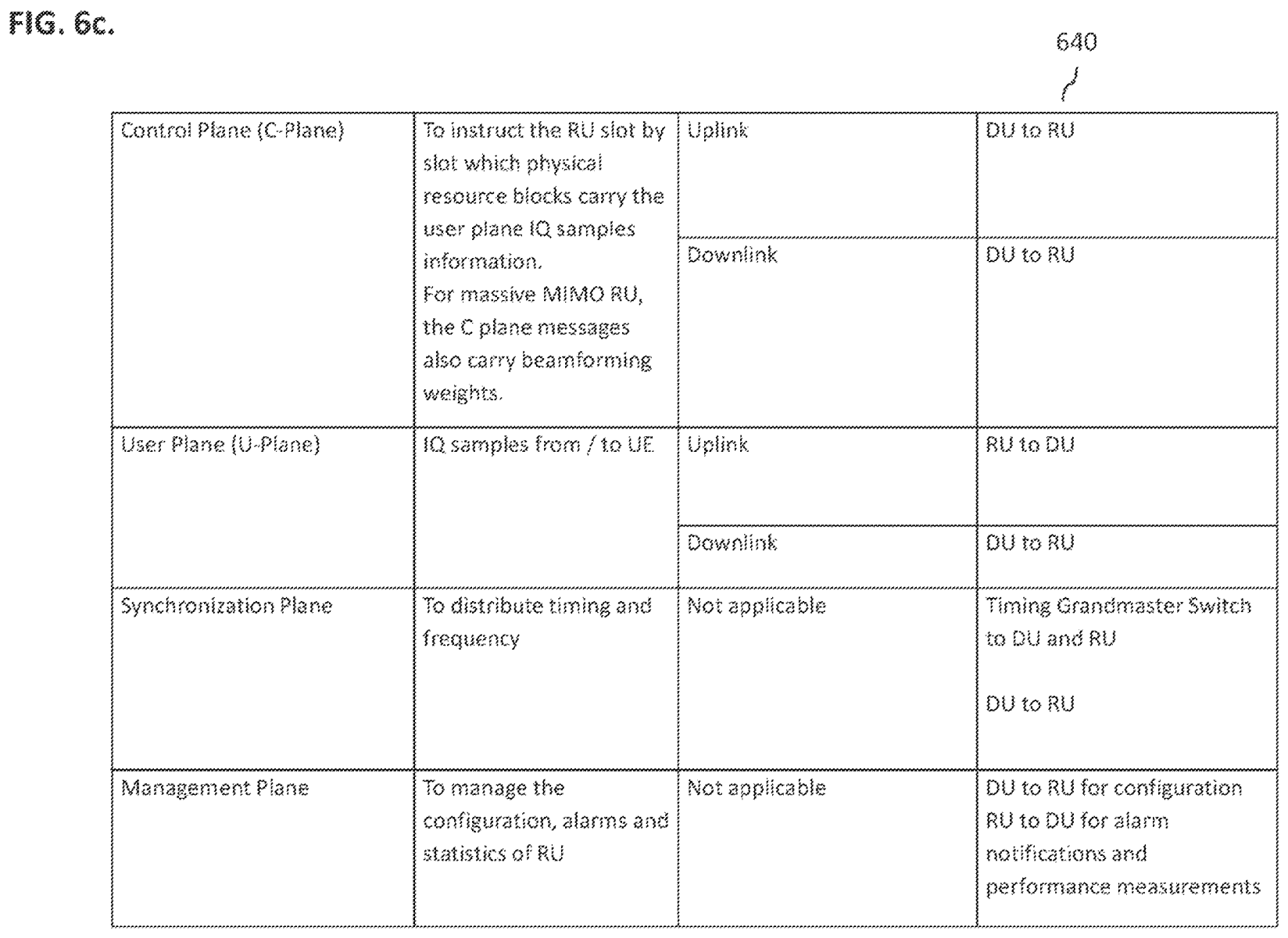

| | | |
|---|---|---|
| Control Plane (C-Plane) | To instruct the RU slot by slot which physical resource blocks carry the user plane IQ samples information. For massive MIMO RU, the C plane messages also carry beamforming weights. | Uplink → DU to RU |
| | | Downlink → DU to RU |
| User Plane (U-Plane) | IQ samples from / to UE | Uplink → RU to DU |
| | | Downlink → DU to RU |
| Synchronization Plane | To distribute timing and frequency | Not applicable → Timing Grandmaster Switch to DU and RU |
| | | DU to RU |
| Management Plane | To manage the configuration, alarms and statistics of RU | Not applicable → DU to RU for configuration, RU to DU for alarm notifications and performance measurements |

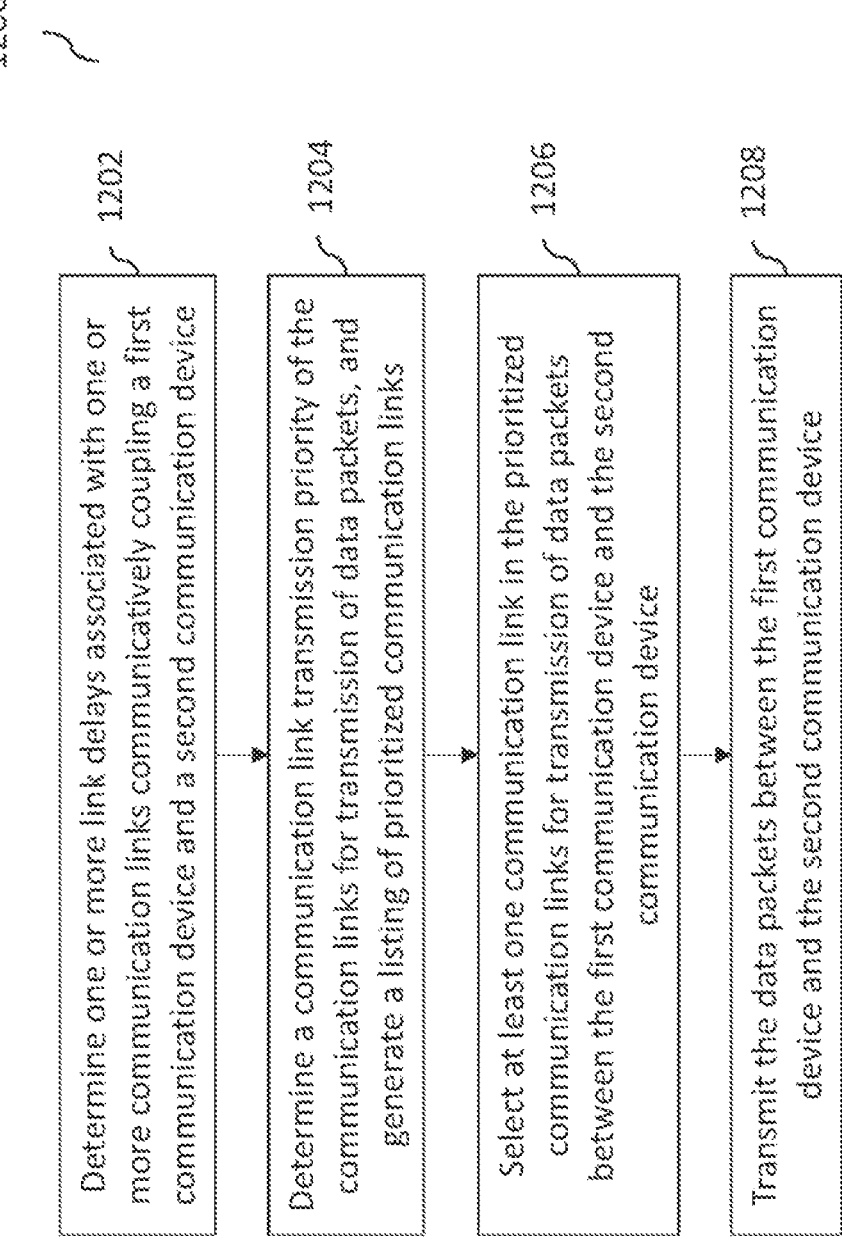

1200

1202 — Determine one or more link delays associated with one or more communication links communicatively coupling a first communication device and a second communication device 1204 — Determine a communication link transmission priority of the communication links for transmission of data packets, and generate a listing of prioritized communication links 1206 — Select at least one communication link in the prioritized communication links for transmission of data packets between the first communication device and the second communication device 1208 — Transmit the data packets between the first communication device and the second communication device

FIG. 12.

FRONTHAUL LINK SELECTION IN WIRELESS COMMUNICATIONS SYSTEMS

CROSS-REFERENCE TO RELATED APPLICATIONS

This application is a continuation application of U.S. patent application Ser. No. 17/403,419, filed Aug. 16, 2021, the disclosure of which is incorporated herein in its entirety by reference.

TECHNICAL FIELD

In some implementations, the current subject matter relates to telecommunications systems, and in particular, to selection of fronthaul links based on radio channel delay sensitive awareness and measured fronthaul link delay in wireless communications systems, such as, for example, 5G New Radio ("NR").

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if the mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G standard is currently being developed and deployed. 3GPP cellular technologies like LTE and 5G NR are evolutions of earlier generation 3GPP technologies like the GSM/EDGE and UMTS/HSPA digital cellular technologies and allows for increasing capacity and speed by using a different radio interface together with core network improvements.

Cellular networks can be divided into radio access networks and core networks. The radio access network (RAN) can include network functions that can handle radio layer communications processing. The core network can include network functions that can handle higher layer communications, e.g., internet protocol (IP), transport layer and applications layer. In some cases, the RAN functions can be split into baseband unit functions and the radio unit functions, where a radio unit connected to a baseband unit via a fronthaul network, for example, can be responsible for lower layer processing of a radio physical layer while a baseband unit can be responsible for the higher layer radio protocols, e.g., MAC, RLC, etc.

A fronthaul network can be sensitive to latency and jitter. Any latency or jitter introduced by the switches that are present in the fronthaul network can have an undesired effect on the functioning of the communication system. In a redundant fronthaul network, each communication link, can have different latency and/or jitter depending on how data packets are transmitted, which can further complicate communications.

SUMMARY

In some implementations, the current subject matter relates to a computer-implemented method for selecting of fronthaul links in a wireless communication system. The method can include determining one or more link delays. The link delays can be associated with one or more communication links in the plurality of communication links communicatively coupling a first communication device and a second communication device. The method can further include determining, using determined one or more link delays, a communication link transmission priority of the communication links for transmission of one or more data packets, and generating a listing of prioritized one or more communication links. The method can also include selecting at least one communication link in the prioritized communication links for transmission of one or more data packets between the first communication device and the second communication device, and transmitting, using the selected communication link, the data packets between the first communication device and the second communication device.

In some implementations, the current subject matter can include one or more of the following optional features. At least one of the determining, the determining the communication link transmission priority, the selecting, and the transmitting can be performed by a base station. The base station can include at least one of the following communication components: radio interface units and distributed units. The distributed units can be configured to interface with the radio interface units for the transmitting of the data packets.

In some implementations, the first communication device can include a distributed unit, and the second communication device can include a radio interface unit. The link delays can include at least one of the following: at least one first link delay associated with a transmission of data packets from the distributed unit to the radio interface unit, at least one second link delay associated with a transmission of data packets from the radio interface unit to the distributed unit, and any combination thereof. A downlink path delay of each available link can be measured by the distributed unit. An uplink path delay of each available link can be measured by the radio interface unit. One or more timestamps associated with an uplink path can be provided to the distributed unit to determine the uplink path delay as the measured uplink path. In some implementations, the method can include determining a delay sensitivity associated with transmission of data packets on the communication links. The delay sensitivity can be determined based on at least one of the downlink path and uplink path delays not exceeding at least one predetermined delay threshold. The communication link transmission priority can be determined using at least one of the downlink path and uplink path delays and the determined delay sensitivity.

In some implementations, the determining the communication link transmission priority can include assigning one or more weight factors to at least one of the downlink path and uplink path delays and the determined delay sensitivity. The generating of the listing can include generating, using the assigned weight factors, a weighted listing of prioritized communication links.

In some implementations, the method can include receiving, by the second communication device, a control plane message from the first communication device on the selected communication link, and transmitting, by the second communication device, a user plane message to the first communication device on the selected communication link.

In some implementations, the method can include receiving, by the second communication device, a control plane message from the first communication device on the selected communication link, and switching, by the second communication device, from at least another communication link in the plurality of communication links to the selected communication link for transmission of a user plane message from the second communication device to the first communication device.

In some implementations, each link in the plurality of communication links can be associated with an Ethernet port of at least one of the first communication device and the second communication device and identified by an extended antenna carrier identifier.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1B illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

FIG. 3 illustrates an exemplary virtual radio access network, according to some implementations of the current subject matter;

FIG. 6c illustrates a table that shows types of messages that may be transmitted on a fronthaul communications link (between DU and RU) along with directions of transmission;

FIG. 12 illustrates an exemplary method, according to some implementations of the current subject matter.

DETAILED DESCRIPTION

The current subject matter can provide for systems and methods that can be implemented in lower layer split architecture for wireless communications systems. Such systems can include various wireless communications systems, including 5G New Radio communications systems, long term evolution communication systems, etc.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1a-c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1A:
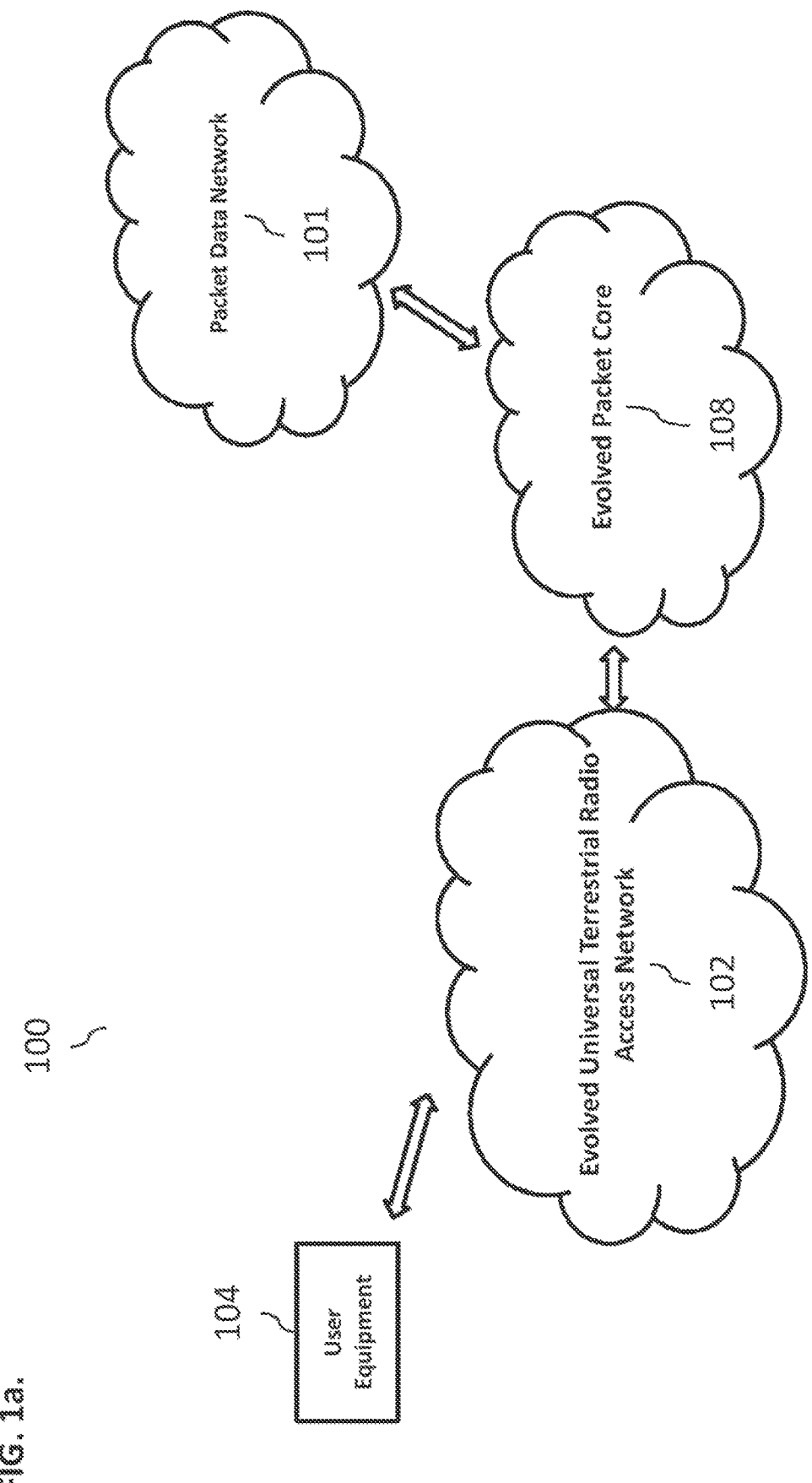
FIG. 1a illustrates an exemplary conventional long term evolution ("LTE") communications system.
Figure 1B:
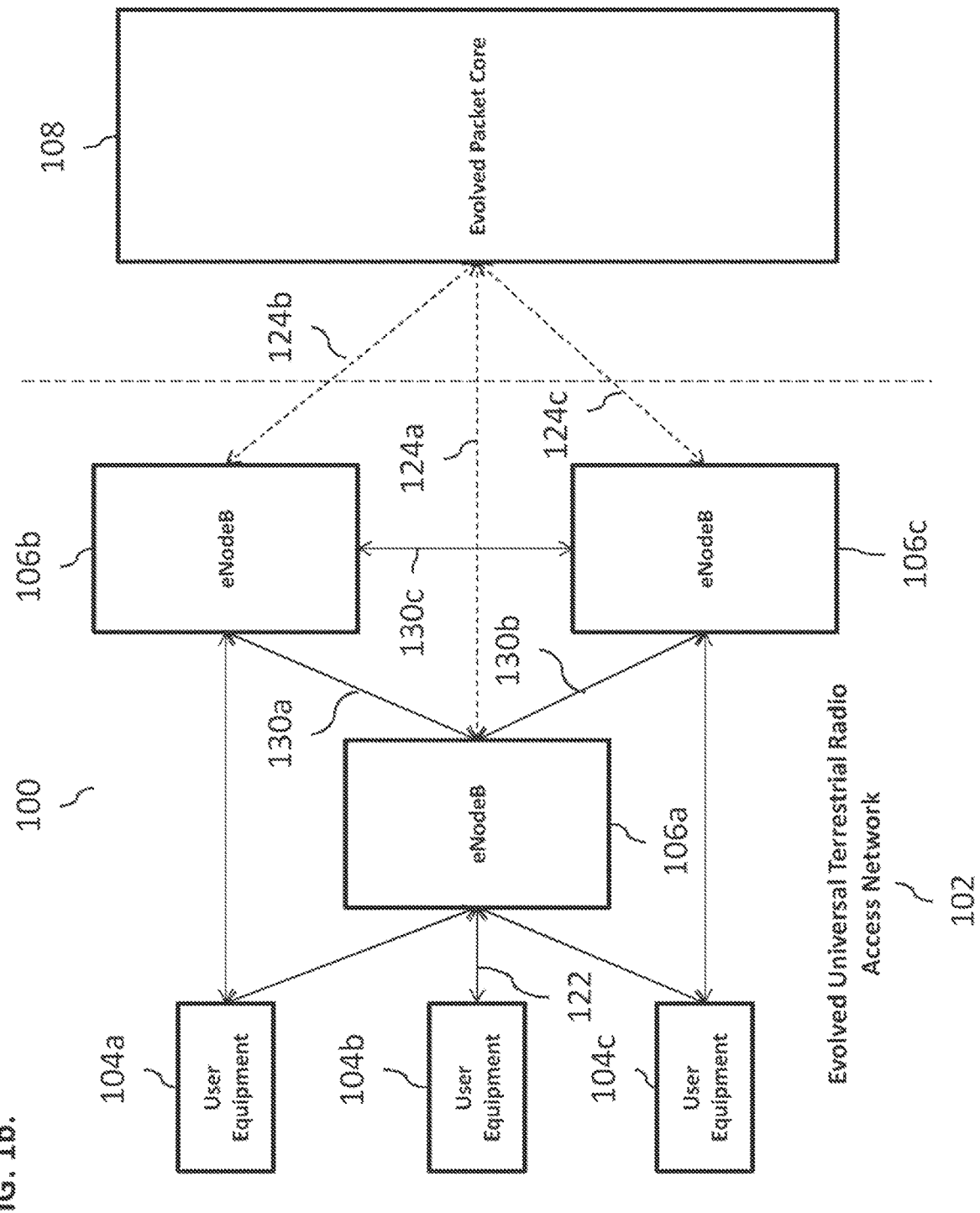

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1B) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
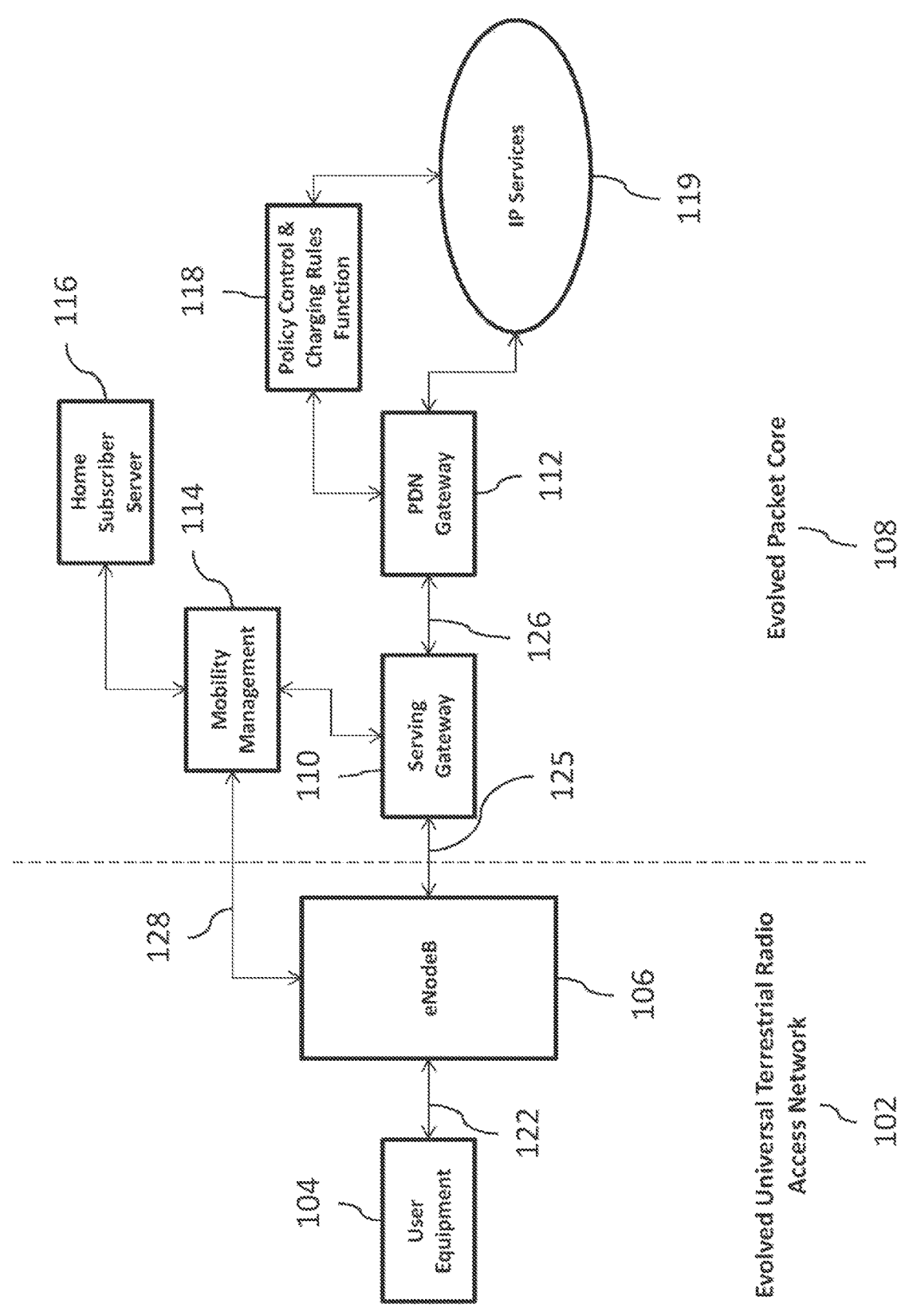

FIG. 1B illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1B, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1a, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1*a*). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1*a*).

Figure 1D:
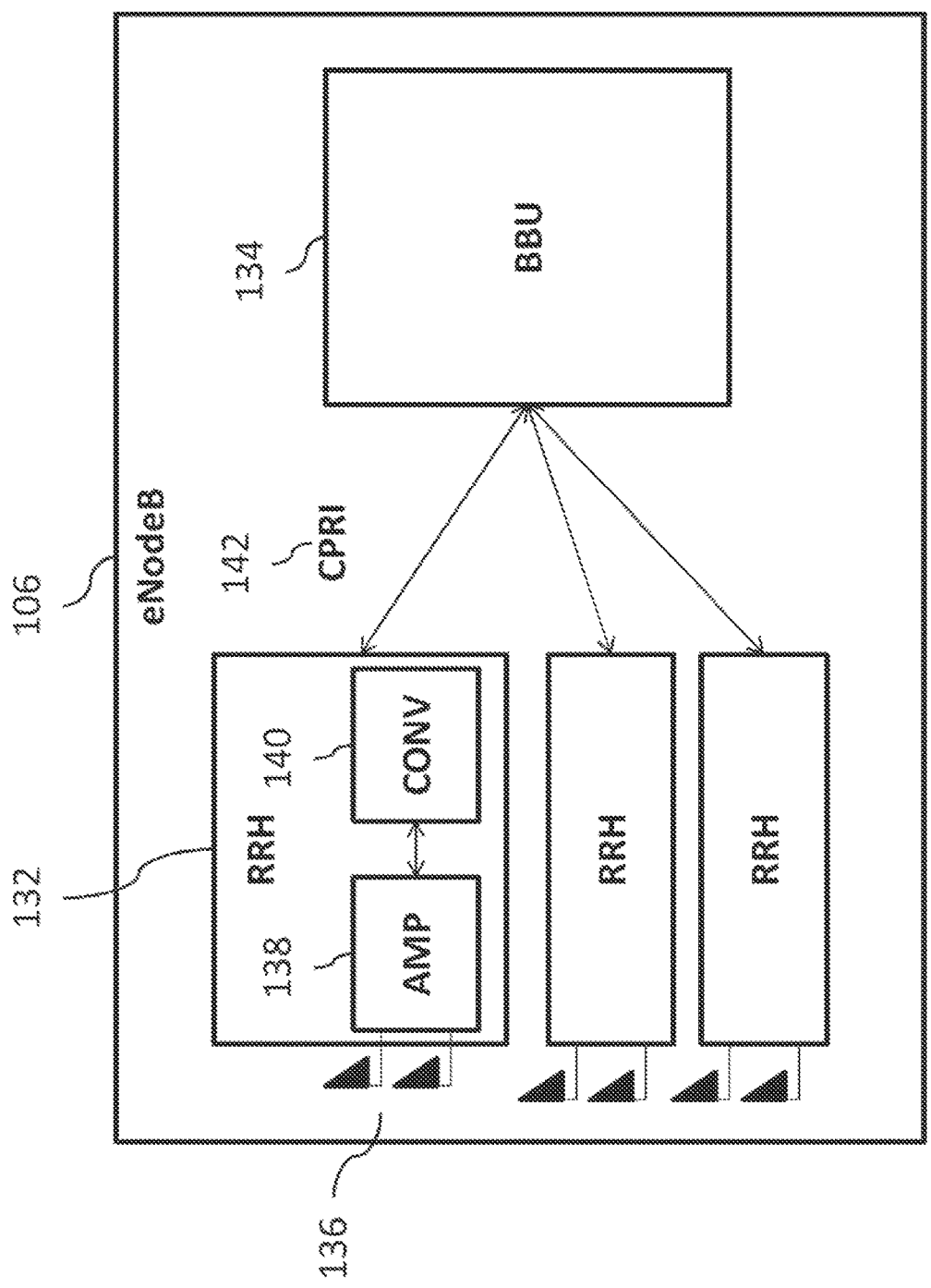

FIG. 1*d* illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI") 142 standard specification. The operation of the eNodeB 106 can be characterized using the following standard parameters (and specifications): radio frequency band (Band4, Band9, Band17, etc.), bandwidth (5, 10, 15, 20 MHz), access scheme (downlink: OFDMA; uplink: SC-OFDMA), antenna technology (downlink: 2×2 MIMO; uplink: 1×2 single input multiple output ("SIMO")), number of sectors (6 maximum), maximum transmission power (60W), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1*d*) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1*d*). Conversely, the RF signals that are received from user equipment 104 are amplified (using AMP 138) and converted (using CONV 140) to digital baseband signals for transmission to the BBU 134.

Figure 2:
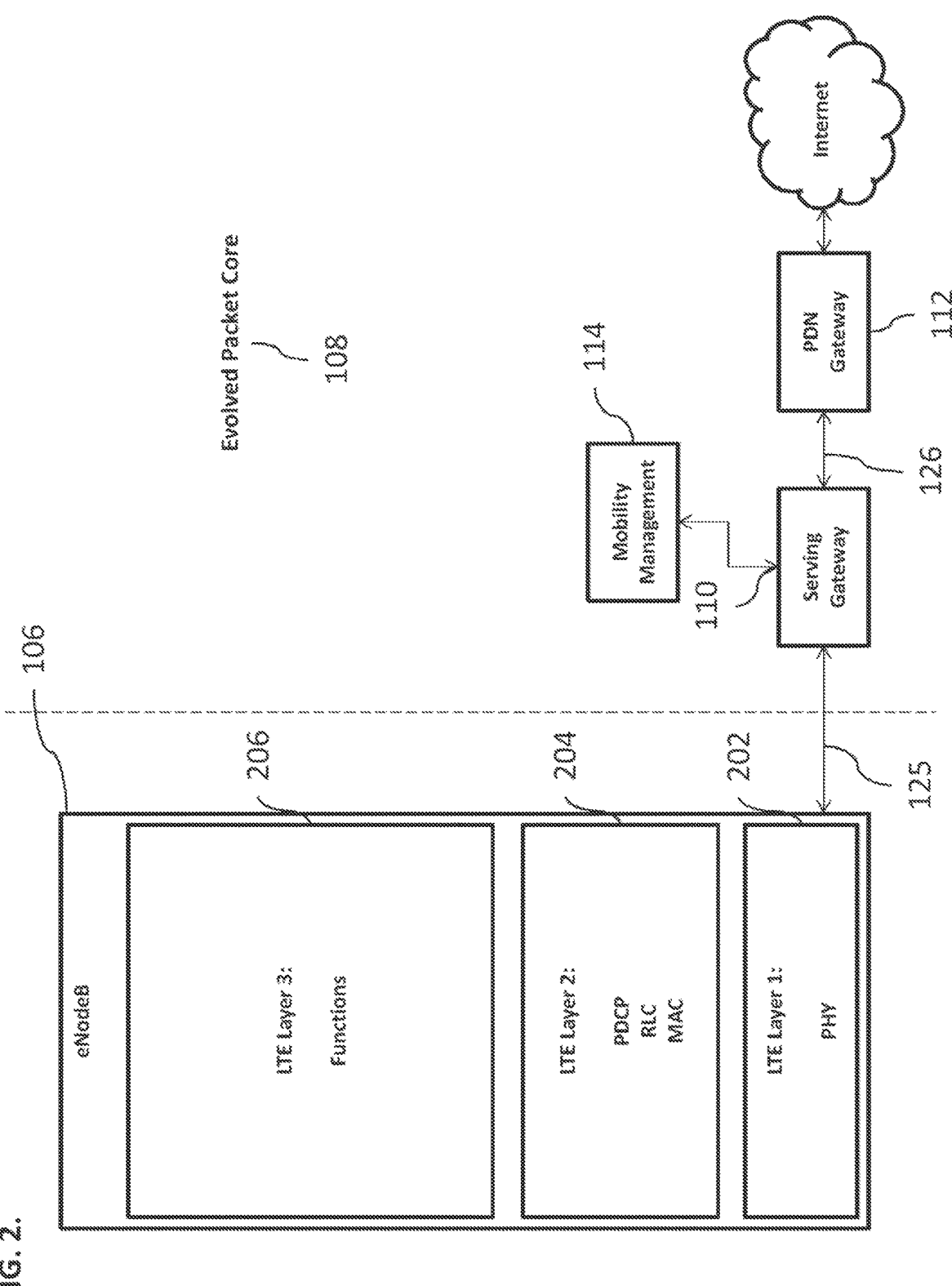
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

II. 5G NR Wireless Communications Networks

In some implementations, the current subject matter relates to a 5G new radio ("NR") communications system. The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when not Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

FIG. 3 illustrates an exemplary virtual radio access network 300. The network 300 can provide communications between various components, including a base station (e.g., eNodeB, gNodeB) 301, a radio equipment 303, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DU units 304. The units 302, 304 can include one or more base stations, macro base stations, micro base stations, remote radio heads, etc. and/or any combination thereof.

In lower layer split architecture environment, a CPRI bandwidth requirement for NR can be 100s of Gb/s. CPRI compression can be implemented in the DU and RU (as shown in FIG. 3). In 5G communications systems, compressed CPRI over Ethernet frame is referred to as eCPRI and is the recommended fronthaul network. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs) for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer-split architecture, frequency-domain samples can be transported via Ethernet fronthaul, where the frequency-domain samples can be compressed for reduced fronthaul bandwidth.

Figure 4:
FIG. 4 illustrates an exemplary 3GPP split architecture to provide its users with use of higher frequency bands.
Figure 4:
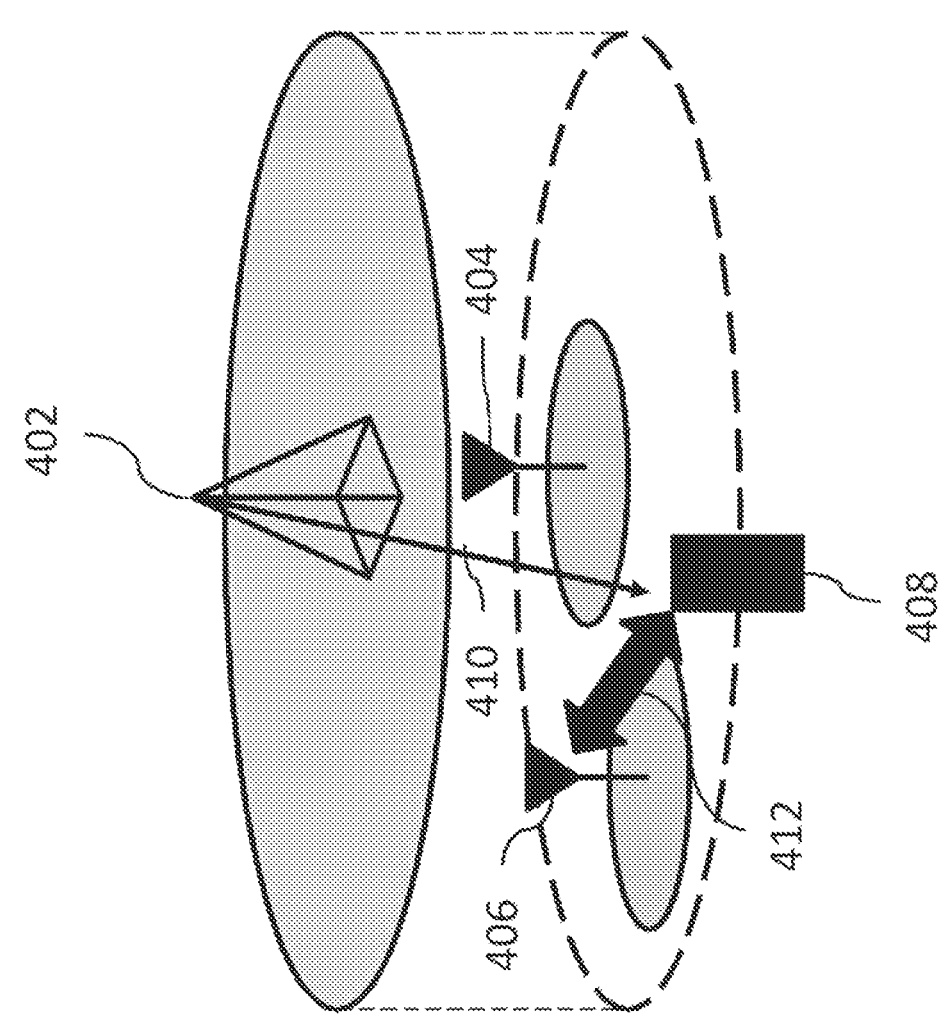

FIG. 4 illustrates an exemplary communications system 400 that can implement a 5G technology and can provide its users with use of higher frequency bands (e.g., greater than 10 GHz). The system 400 can include a macro cell 402 and small cells 404 and 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 402, 404 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE PUCCH and NR PUCCH can be transmitted on the same frequency.

Figure 5A:
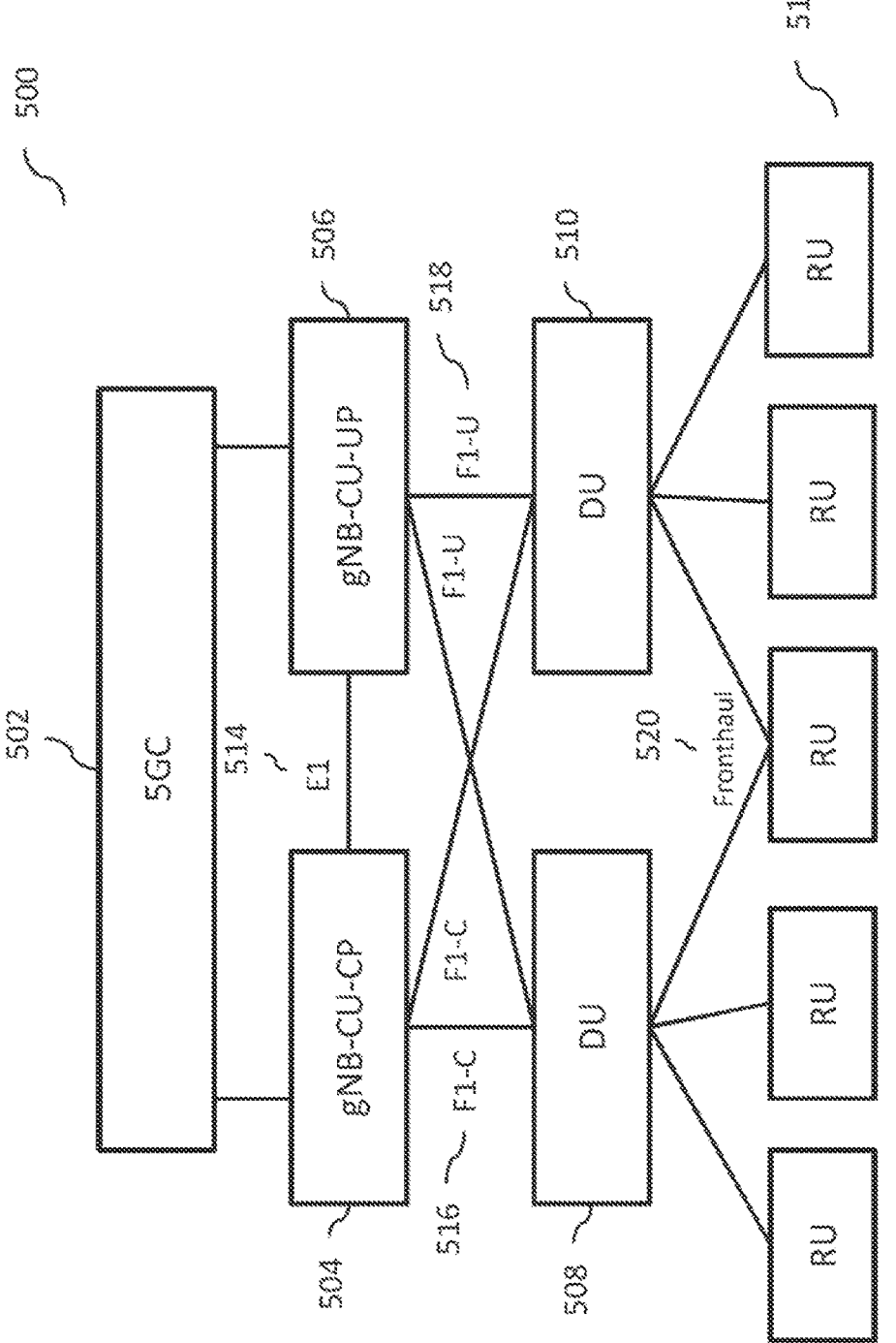
FIG. 5a illustrates an exemplary 5G wireless communication system.

FIG. 5a illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs can have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 can be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the lower layer split architecture. The distributed units 508, 510 can be configured to execute RLC, MAC and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul network 520 (which may include one or switches, links, etc.), which in turn communicate with one or more user equipment (not shown in FIG. 5a). The remote radio units 512 can be configured to execute a lower part of the PHY layer protocols as well as provide antenna capabilities to the remote units for communication with user equipments (similar to the discussion above in connection with FIGS. 1a-2).

Figure 5B:
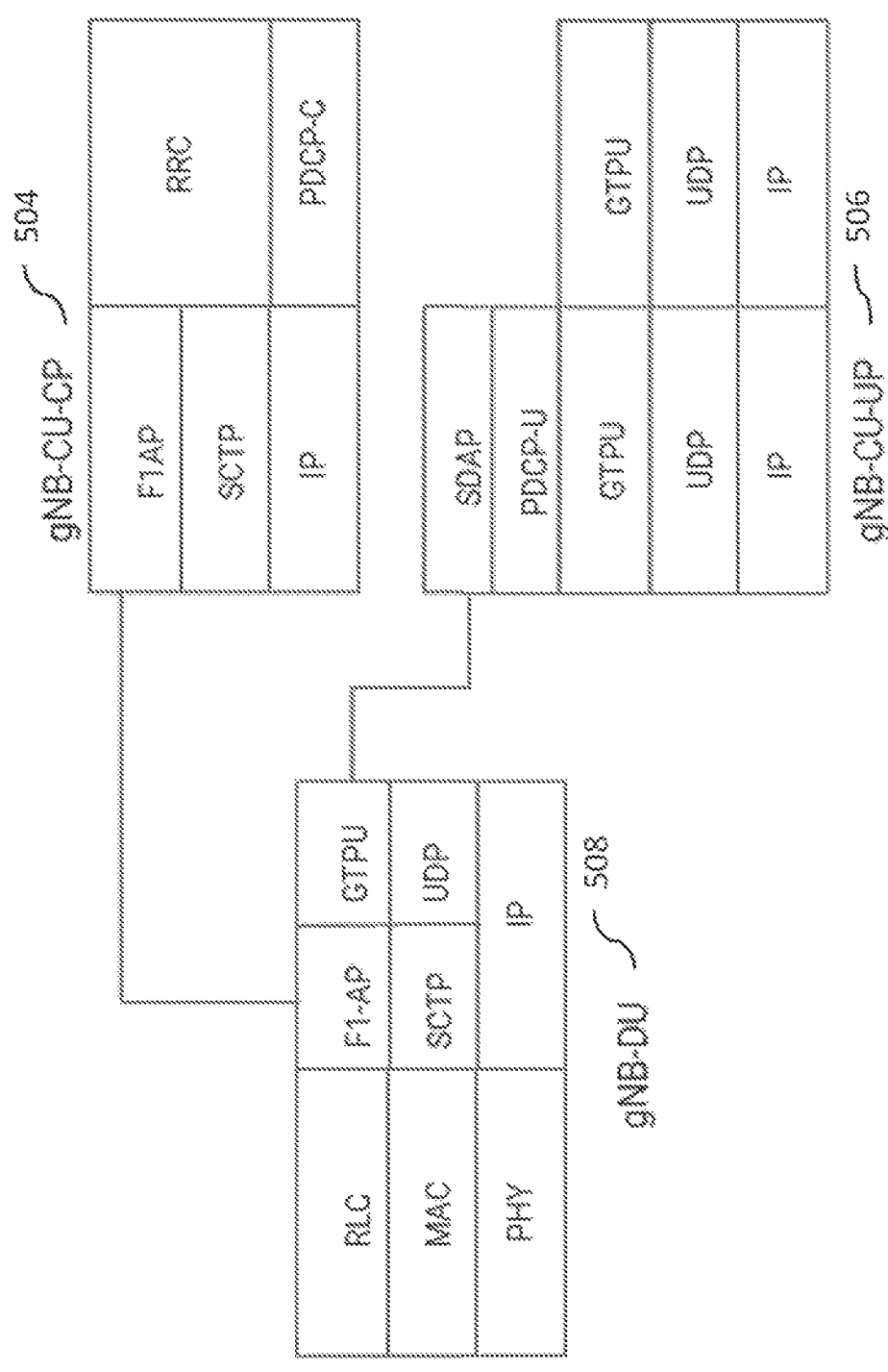
FIG. 5b illustrates an exemplary layer architecture of the split gNB.

FIG. 5b illustrates an exemplary layer architecture 530 of the split gNB. The architecture 530 can be implemented in the communications system 500 shown in FIG. 5a, which can be configured as a virtualized disaggregated radio access network (RAN) architecture, whereby layers L1, L2, L3 and radio processing can be virtualized and disaggregated in the centralized unit(s), distributed unit(s) and radio unit(s). As shown in FIG. 5b, the gNB-DU 508 can be communicatively coupled to the gNB-CU-CP control plane portion 504 (also shown in FIG. 5a) and gNB-CU-UP user plane portion 506. Each of components 504, 506, 508 can be configured to include one or more layers.

The gNB-DU 508 can include RLC, MAC, and PHY layers as well as various communications sublayers. These can include an F1 application protocol (F1-AP) sublayer, a GPRS tunneling protocol (GTPU) sublayer, a stream control transmission protocol (SCTP) sublayer, a user datagram protocol (UDP) sublayer and an internet protocol (IP) sublayer. As stated above, the distributed unit 508 may be communicatively coupled to the control plane portion 504 of the centralized unit, which may also include F1-AP, SCTP, and IP sublayers as well as radio resource control, and PDCP-control (PDCP-C) sublayers. Moreover, the distributed unit 508 may also be communicatively coupled to the user plane portion 506 of the centralized unit of the gNB. The user plane portion 506 may include service data adaptation protocol (SDAP), PDCP-user (PDCP-U), GTPU, UDP and IP sublayers.

Figure 5C:
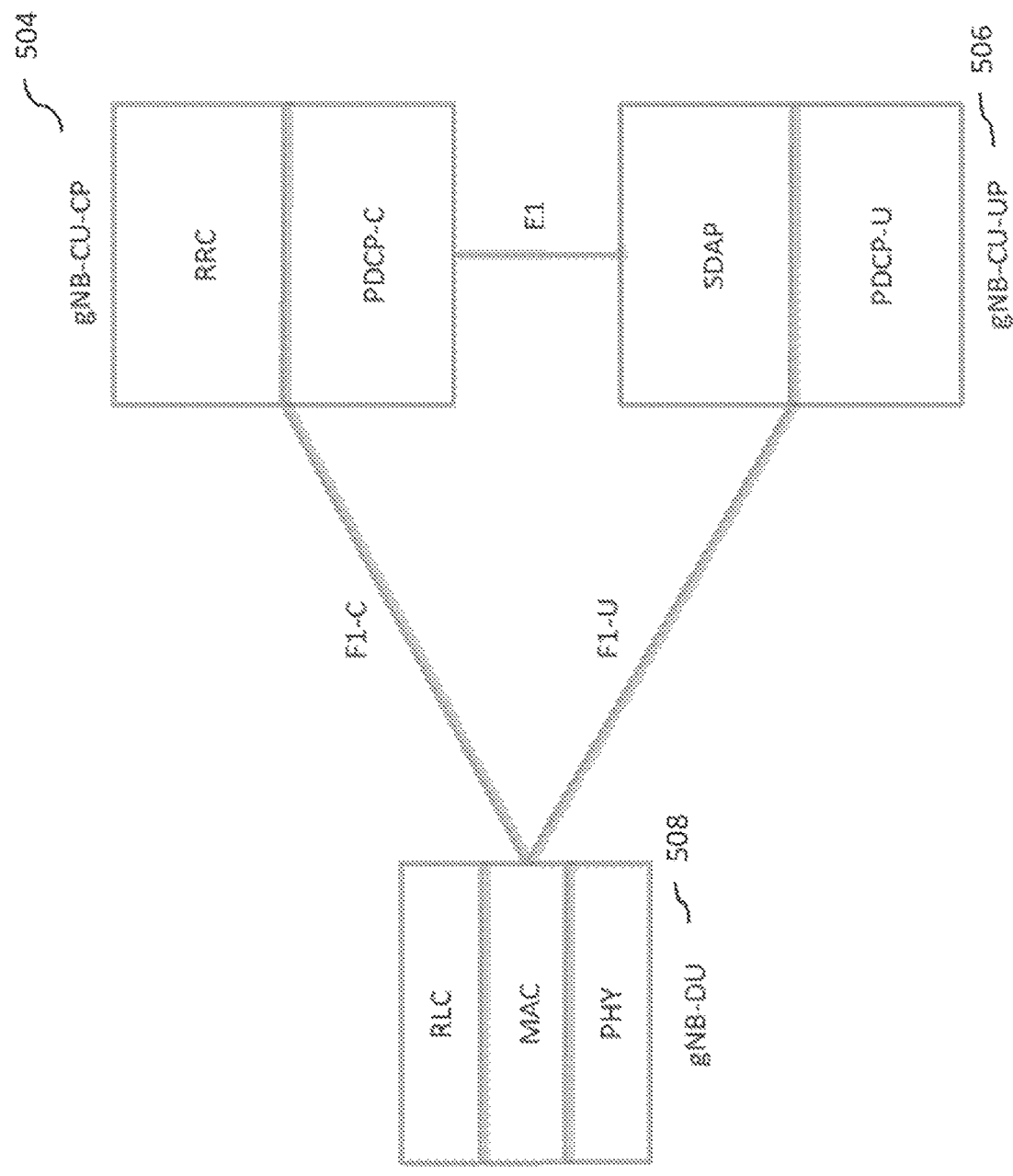
FIG. 5c illustrates an exemplary functional split in the gNB architecture shown in FIGS. 5a-b.

FIG. 5c illustrates an exemplary functional split in the gNB architecture shown in FIGS. 5a-b. As shown in FIG. 5c, the gNB-DU 508 may be communicatively coupled to the gNB-CU-CP 504 and GNB-CU-UP 506 using an F1-C communication interface. The gNB-CU-CP 504 and GNB-CU-UP 506 may be communicatively coupled using an E1 communication interface. The higher part of the PHY layer (or Layer 1) may be executed by the gNB-DU 508, whereas the lower parts of the PHY layer may be executed by the RUs (not shown in FIG. 5c). As shown in FIG. 5c, the RRC and PDCP-C portions may be executed by the control plane portion 504, and the SDAP and PDCP-U portions may be executed by the user plane portion 506.

Some of the functions of the PHY layer in 5G communications network can include error detection on the transport channel and indication to higher layers, FEC encoding/ decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming, RF processing, as well as other functions.

The MAC sublayer of Layer 2 can perform beam management, random access procedure, mapping between logical channels and transport channels, concatenation of multiple MAC service data units (SDUs) belonging to one logical channel into transport block (TB), multiplexing/ demultiplexing of SDUs belonging to logical channels into/ from TBs delivered to/from the physical layer on transport channels, scheduling information reporting, error correction through HARQ, priority handling between logical channels of one UE, priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer can be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

Figure 6A:
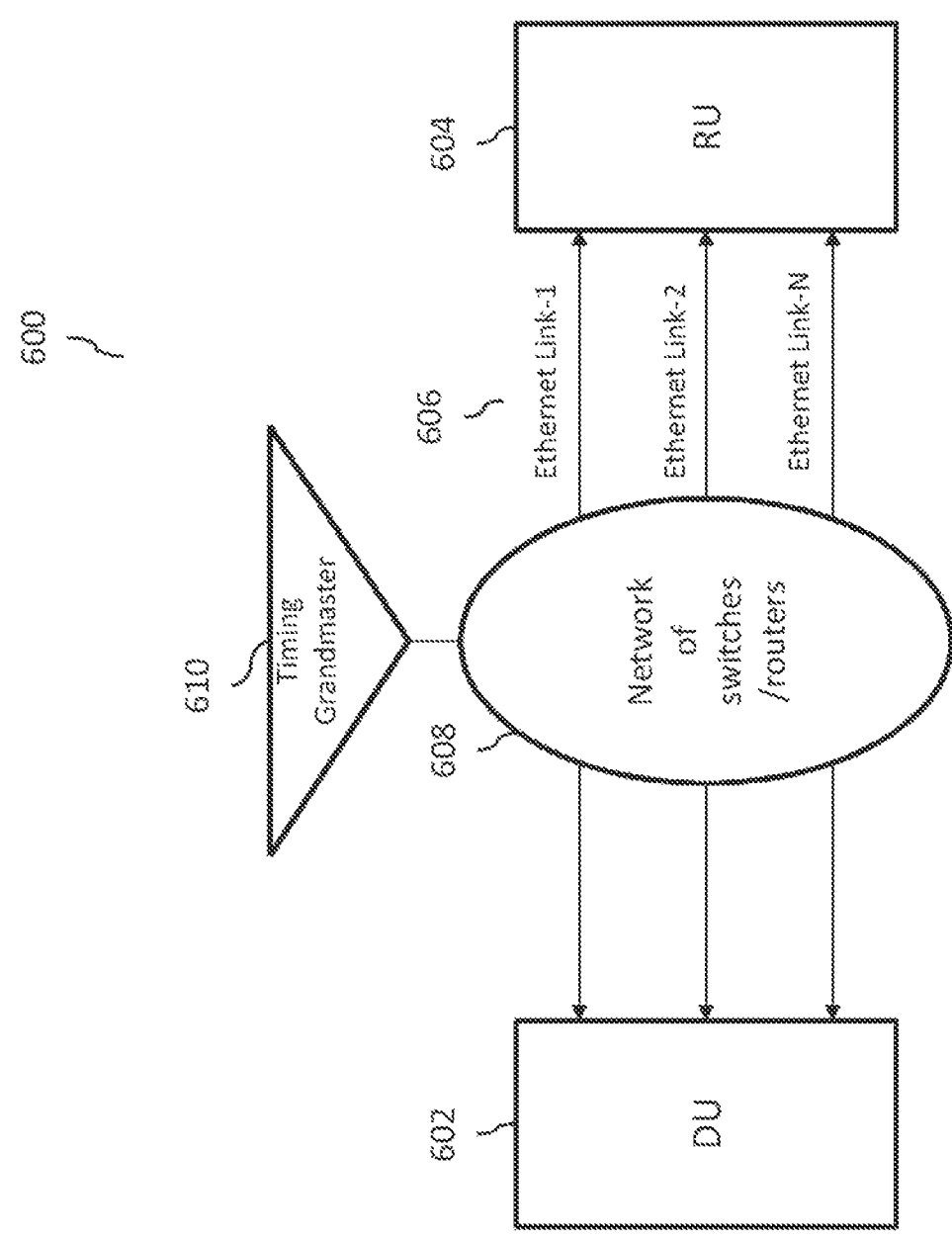
FIG. 6a illustrates an exemplary wireless communications system showing details of a fronthaul network.

FIG. 6a illustrates an exemplary wireless communications system 600. The system 600 can include a distributed unit (DU) 602 communicatively coupled to a radio unit (RU) 604 via one or more network switches/routers 608 using one or more Ethernet links 606. The system 600 can also include one or more synchronization masters that can be selected for each of the network segments in the system, where a root timing reference is referred to as a grandmaster, e.g., timing grandmaster 610. The grandmaster can transmit synchronization information to the clocks residing on its network segment, whereby, upon selection of a grandmaster, all other clocks can synchronize directly to it. A precision time protocol (PTP) (as originally defined in IEEE 1588-2002 standard) can be used to synchronize clocks throughout the system 600. The PTP can be used to achieve clock accuracy in a sub-microsecond range. In some cases, both the DU 602 and RU 604 can be configured to use PTP protocol for the purposes of clock synchronization.

The NETCONF/YANG protocol (or application layer mode of communication) can be used for operations and/or management of network functions. The NETCONF/YANG is a network management protocol developed and standardized by the Internet Engineering Task Force (IETF) under RFC 4741 and RFC 6241 standards. The protocol provides mechanisms to install, manipulate, and delete configuration of network devices.

Figure 6B:
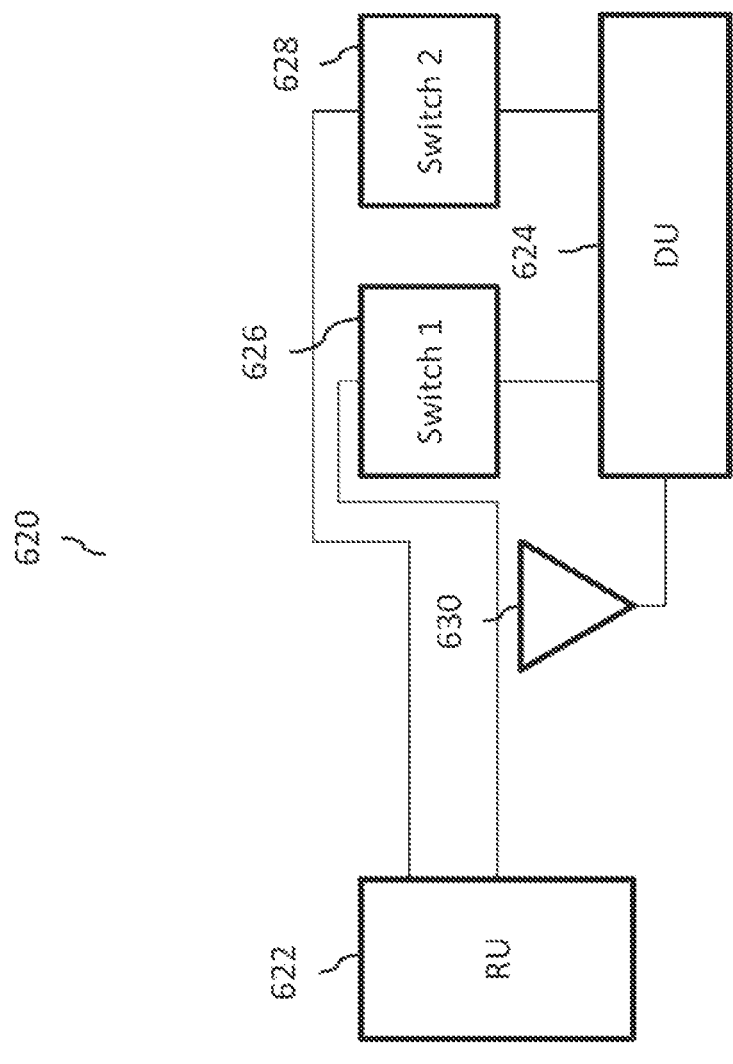
FIG. 6b illustrates an alternate wireless communications system including a redundant fronthaul network.

FIG. 6b illustrates an alternate wireless communications system 620. In the system 620, the radio unit 622 can be communicatively coupled to the distributed unit 624 via one or more switches 626 (e.g., switch 1) and 628 (e.g., switch 2). A timing grandmaster 630 can be positioned with the distributed unit 624.

FIG. 6c illustrates a table 640 that shows types of messages that may be transmitted on a fronthaul communications link (between DU and RU) along with directions of transmission. The messages can be transmitted in the control plane (C-plane), user plane (U-plane), synchronization plane (S-plane), and management plane (M-plane). The control plane can include uplink and downlink messages (both DU to RU). The user plane can also include uplink (RU to DU) and downlink (DU to RU) messages, where IQ samples can be transmitted to/from user equipment. The uplink/downlink directions are not applicable to the transmission of messages in the synchronization and management planes. As stated above, the synchronization plane includes messages carrying timing information, as related to the timing grandmaster. The management plane carries messages related to configuration (DU to RU) and notifications/measurements (RU to DU).

Various issues can occur when redundant links are used for resiliency on the fronthaul. In particular, the fronthaul network is extremely sensitive to latency and jitter. The radio units typically expect the C-plane and U-plane messages at exact time windows, slot-by-slot. The arrival times of the first and last messages at the RU and the DU for a particular slot and/or symbol are specifically dependent on the respective receive window parameters/designs. Thus, any latency and/or jitter introduced by the switches (e.g., switches 608, 626, 628, shown in FIGS. 6a-b) in the fronthaul link can have a detrimental effect on the functioning of the RUs and/or the DUs. In a redundant fronthaul network (e.g., network with multiple fronthaul links, as shown, for example in FIGS. 6a-b), each fronthaul link can experience different latency and/or jitter depending on the path each link takes in the fronthaul link network. If multiple links between DU and RU are deployed (as shown in FIGS. 6a-b), same set of switches might not be used so as to avoid the above issues.

Figure 7:
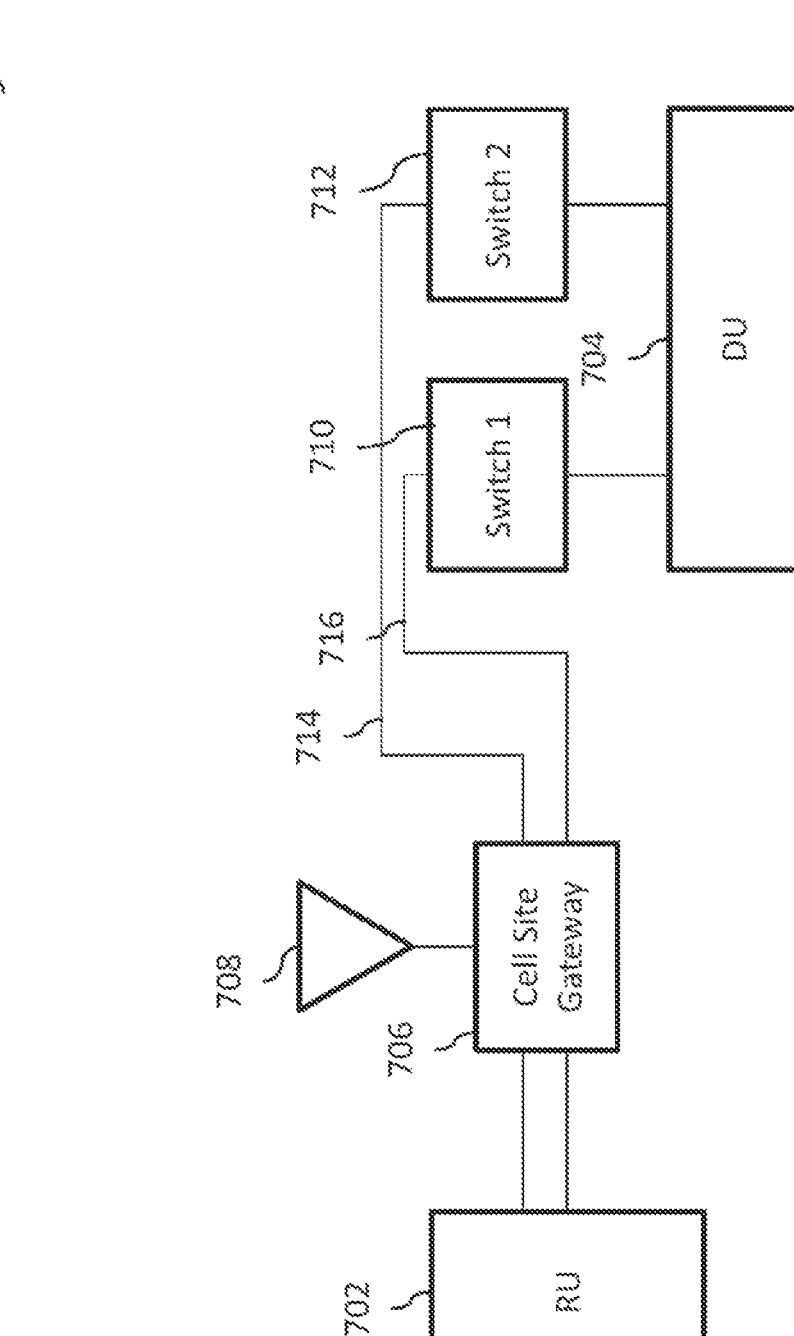
FIG. 7 illustrates an exemplary redundant fronthaul link network.

FIG. 7 illustrates an exemplary redundant fronthaul link network 700. The network 700 can include a RU 702, a DU 704, a gateway 706, a timing grandmaster 708, a switches 710 (switch 1), 712 (switch 2). The RU 702 and DU 704 can be communicatively coupled using links 714 and 716 via the gateway 706. The links 714 and 716 may be Ethernet fronthaul links. It is possible that the link 714 can experience different latency and/or jitter than the link 716.

Figure 8:
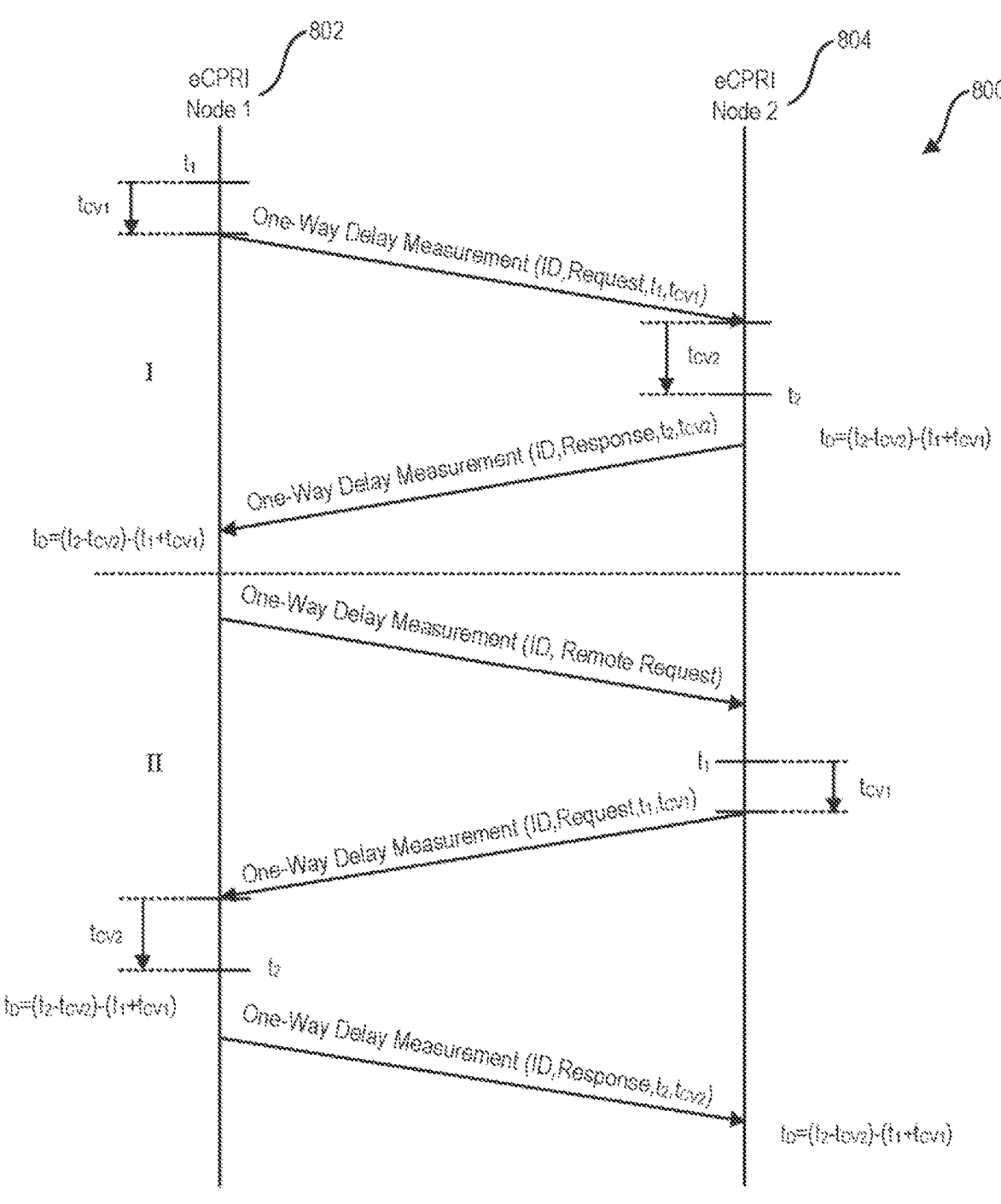
FIG. 8 illustrates an exemplary one way delay measurement call flow diagram.

In order to adjust the timing of the transmission of the control and user plane messages, based on the latency experienced on a particular fronthaul link, one way latency between the DU and the RU on each link may be determined. FIG. 8 illustrates an exemplary one way delay measurement call flow diagram 800. The process shown in FIG. 8 can be performed between two nodes, i.e., node 1 802 and node 2 804. The nodes 802, 804 can be portions of a base station, e.g., DU and RU, respectively.

Specifically, one way latency can be measured from DU to RU (shown as stage "I" in FIG. 8) as well as from RU to DU (shown as stage "II" in FIG. 8). The RU to DU delay can be measured by the DU using one or more eCPRI messages. As shown in FIG. 8, the DU to RU delay can be measured using one or more one-way delay measurements. A delay measurement from DU to RU can include an ID (e.g., Extended Antenna Carrier ID), request data, start time, $t_1$, and a difference between start time and sending out the measurement request, $t_{ev1}$. The request from DU can be received by RU and RU can send a response to DU a short time after, i.e., at time, $t_2$, which can be some time, i.e., $t_{ev2}$, after receipt of the request. The RU's response can include the ID, response data, and times $t_2$ and $t_{ev2}$. The total delay time, $t_1$, is the computed as difference between the above times, i.e., using $t_d=(t_2-t_{ev2})-(t_1+t_{ev1})$.

The RU to DU delay (stage II) can be determined in a similar fashion. In this case, the delay measurement may be initiated as a result of a one way delay measurement request that may be transmitted from the DU and may include an ID and a remote request data from DU. Once the request from DU is received, the RU can transmit a one-way delay measurement request to DU that can include ID, request data, start time, $t_1$, and a difference between start time and transmitting the measurement request, $t_{ev1}$. The DU can then respond to RU with the ID, response data, and times $t_2$ and $t_{ev2}$. The total delay time, $t_d$, can then again be computed as difference between the above times, i.e., using $t_d=(t_2|t_{ev2})-(t_1+t_{ev1})$, where the first times (i.e., $t_2$ and $t_{ev2}$) correspond to the times associated with RU and second times (i.e., $t_1$ and $t_{ev1}$) correspond to time associated with DU.

At the radio interface level, Extended Antenna Carrier ID (eAxC ID) can be used to identify different antenna carriers and channel ports in the RU. For example, each of the antenna ports (e.g., 4 ports) can receive a unique eAxC ID for different channels. The eAxC ID can be a 16 bit value split into 4 fields, e.g., DU port ID, band sector ID, carrier ID, RU port ID. The bit width for each field can be configurable. Table 1 illustrates an exemplary eAxC ID schematic. Table 1 also identifies whether each of the channel's format is delay sensitive or not.

TABLE 1

Channel format delay sensitivity parameters.

| Channel Format | Is delay sensitive? | Typical delay parameters | Antenna Port | eAxCID |
|---|---|---|---|---|
| PRACH (uplink random access) | No | Not delay managed | 0 | 1 |
| | | | 1 | 2 |
| | | | 2 | 3 |
| | | | 3 | 4 |
| PDxCH (downlink physical channels) | Yes | Transmit windows are typically 1 to 2 symbol duration | 0 | 5 |
| | | | 1 | 6 |
| | | | 2 | 7 |
| | | | 3 | 8 |
| PUxCH (uplink physical channels) | Yes | Transmit windows are typically 1 to 2 symbol duration | 0 | 9 |
| | | | 1 | 10 |
| | | | 2 | 11 |
| | | | 3 | 12 |

TABLE 1-continued

Channel format delay sensitivity parameters.

| Channel Format | Is delay sensitive? | Typical delay parameters | Antenna Port | eAxCID |
|---|---|---|---|---|
| Sounding Reference Signal (Uplink) - SRS | No | Not delay managed | 0 | 13 |
| | | | 1 | 14 |
| | | | 2 | 15 |
| | | | 3 | 16 |

As shown in Table 1, the channel formats include PRACH (uplink random access), PDxCH (downlink physical channels), PUxCH (uplink physical channels), and sounding reference signal (SRS). It should be noted that for example, for a 32 port massive MIMO, the SRS can be sent on all 32 antenna ports, where Table 1 shows a 4-port system for ease of illustration and simplicity. Both PRACH and SRS are not delay sensitive, and thus, tight boundaries for transmit and/or receive windows are not applicable for these channel formats. However, for the downlink and uplink physical channels, which are delay sensitive, transmit windows can be typically 1 to 2 symbol duration (where 1 symbol=71 usec for 15 KHz SCS and 36 usec for 30 KHz SCS).

Various conventional systems provide a mechanism to associate each eAxC ID to a particular RU Ethernet port (e.g., MAC address), so that uplink and downlink channels can use different fronthaul links and traverse different paths. However, currently, there is no mechanism to dynamically associate an eAxC ID with a particular Ethernet port at the DU or at the RU depending on the one way latency determined/measured on that link. For example, if the DU instructs the RU to use a particular Ethernet port for uplink channel eAxC ID, conventional systems do not provide for the DU to communicate to the RU the switching of a path.

III. Fronthaul Link Selection in Wireless Communications Systems

In some implementations, to address the above deficiencies of conventional systems, the current subject matter may be configured to determine whether a particular RU supports a dynamic association of an eAxC ID to an Ethernet port, instead of static association at initialization time. The current subject matter may be further configured to allow the RU (assuming such capability is supported) to switch a particular eAxC ID's traffic to a specific Ethernet link (e.g., using a specific Ethernet port).

For example, the current subject matter may be configured to use one-way delay/latency measurement (as shown in FIG. 8) on the Ethernet link to adjust one or more transmit windows for the control and/or user plane messages, in accordance with the measured delay. The linkage of the physical channel to Ethernet port in the RU can be configured a priori. For example, the RU and the DU may be configured and/or instructed to select an Ethernet link having the least amount of determined/measured delay for channel formats that are delay sensitive (e.g., PDxCH and PUxCH) are delay sensitive. In particular, selection of such links for these channel formats can have a highest priority. Further, since PRACH channel format is not delay sensitive, the uplink PRACH IQ sample transfer can take any available path, as long as the measured delay is below a predetermined threshold that is acceptable for PRACH channel handling.

Additionally, the RU and DU can be instructed to select a particular Ethernet link based on a specific policy (e.g., operator policy) that can be in place. For example, the policy can be determined based on link usage and/or any other factors. In this case, different priorities can be assigned for each Ethernet link via a particular configuration, where the real-time latency measured on such links might not have the same prioritized order (e.g., the highest priority link might not have the least latency at all times). Such policy-based priority assignments may be due to, for example, service level agreement (SLA) reasons, e.g., if the fronthaul transport network is leased from a transport network operator. In some implementations, the current subject matter can be configured to algorithmically determine priority for each link in the plurality of links (for each eAxC ID) based on at least one of the following factors (e.g., as determined at the DU): a priority assigned by the operator during initial configuration, a latency as measured on each link, and/or any combination thereof.

Further, in some wireless communications networks, such as multi-operator radio access network (RAN) networks (MORANs), each public land mobile network (PLMN) can include a separate DU instance. In this case, each such DU instance can act as a PTP grandmaster and each RU, acting as telecom time slave clock (T-TSC) can determine which PTP grandmaster it can use for synchronization purposes. If one of the PLMN instances is terminated (e.g., stopped) in the DU, then the RU may need to be configured to not use the link bound to the terminated PLMN's DU instance for S-plane traffic because terminating the PLMN instance on the DU (to which RU was synchronized), does not need to stop the S plane traffic/clock distribution from that DU host.

In some implementations, the current subject matter can be configured to identify a RU that can support dynamic association of an eAxC ID to an Ethernet port, instead of statically associating it at initialization time. Further, the current subject matter can be configured to inform the RU (that supports the capability) to switch a particular eAxC IDs traffic to a particular Ethernet link. Further, the RUs and DUs can be configured to use one or more fronthaul links, as per a mapping of eAxC IDs to links that may be provided to RUs/DUs.

Figures 9A, 9B:
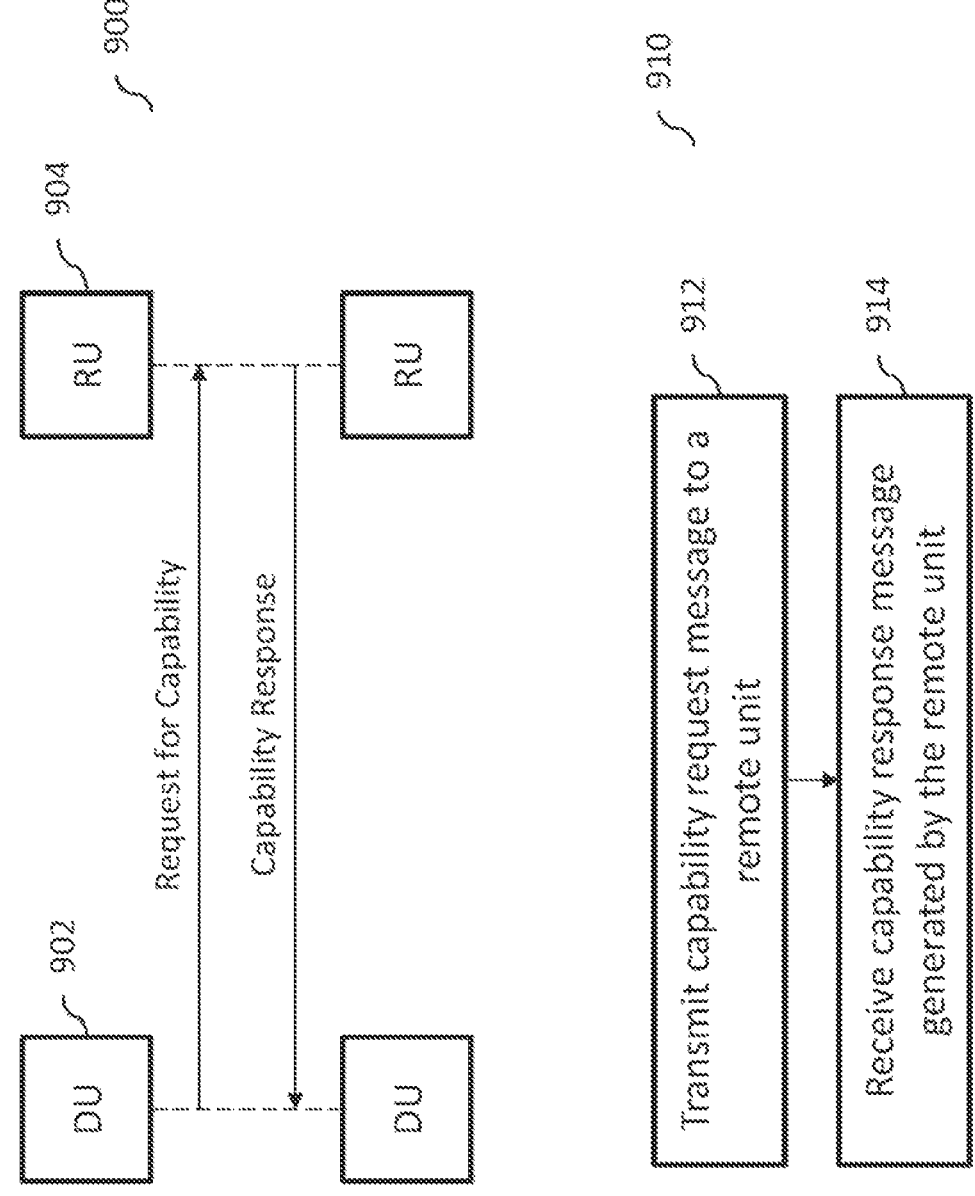
FIG. 9a illustrates an exemplary system for determining RU capabilities for supporting dynamic association of eAxC ID to one or more Ethernet ports, according to some implementations of the current subject matter.
FIG. 9b illustrates an exemplary process for determining RU capabilities that can be performed by the system shown in FIG. 9a, according to some implementations of the current subject matter.

FIG. 9a illustrates an exemplary system 900 for determining RU capabilities for supporting dynamic association of eAxC ID to one or more Ethernet ports, according to some implementations of the current subject matter. FIG. 9b illustrates an exemplary process 910 for determining RU transmitted during RU's initialization, whereby the RU 904 can exchange its capabilities with a management plane controller (e.g., DU 902 or EMS). The exchange can be conducted via a NETCONF capability exchange procedure. RU 904 can respond to the DU 902, at 914 as shown in FIG. 9b, by generating a capabilities response message and transmitting it to the DU 902. The RU 904 can generate its message in a Boolean type format and/or any other desired format. For example, the following procedure can be used to determine RU's capabilities:

```
leaf dynamic-eaxcid-eth-port-linking {
    description "Indicates that the Radio Unit supports
        dynamic linking of eAxCId to fronthaul Ethernet port
        on which the control plane command for that eAxCId
        is received";
    type Boolean;
}
```

Figure 10:
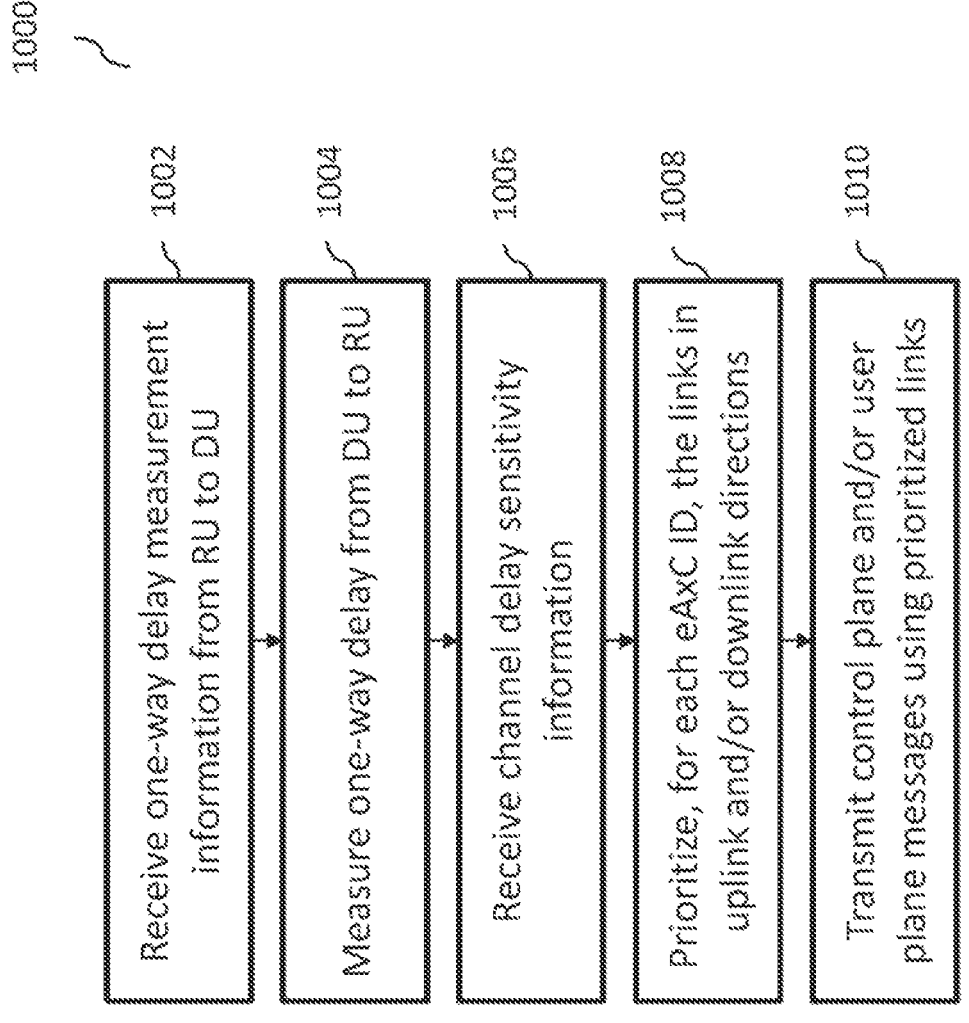
FIG. 10 illustrates an exemplary process for communicating, by the DU, an Ethernet link that selected for control/user (C/U) plane traffic corresponding to a specific eAxC ID, according to some implementations of the current subject matter.

FIG. 10 illustrates an exemplary process 1000 for communicating, by the DU, an Ethernet link that selected for control/user (C/U) plane traffic corresponding to a specific eAxC ID, according to some implementations of the current subject matter. The process 1000 can be performed by the system 900 shown in FIG. 9. At 1002, the DU 902 can be configured to receive and/or, otherwise, obtain one-way delay measurement information from RU to DU (as discussed above with regard to FIG. 8) for each Ethernet link associated with each eAxC ID (e.g., different eAxC IDs).

At 1004, the DU 902 can measure one-way delay from DU to RU (as discussed above with regard to FIG. 8). At 1006, the DU can also be provided with or, otherwise, can receive an indication (along with corresponding eAxC IDs) stating which specific channel Ethernet link is delay sensitive. At 1008, the DU can prioritize (and/or rank), for each eAxC ID, in the uplink and/or downlink directions, the links. The links can be prioritized using at least one of the following parameters: delay sensitiveness requirement of the particular radio channel (e.g., using eAxC ID), one-way measured DU to RU delay (e.g., on the downlink), one way determined RU to DU delay (e.g., on the uplink), a link prioritization policy that can be configured by a mobile operator (e.g., which can be optional), and any combinations thereof. Table 2 illustrates an exemplary ranking of Ethernet links (using eAxC IDs):

TABLE 2

Ranking of Ethernet links.

| eAxC ID | Ethernet Port | Weight for link delay | Priority based on link delay | Weight for policy | Priority based on policy | Weighted Priority | Rank |
|---------|---------------|-----------------------|------------------------------|-------------------|--------------------------|-------------------|------|
| 1-4 (PRACH) | Eth0 | 0.1 | 2 | 0.9 | 1 | 0.1*2 + 0.9*1 = 1.1 | 2 |
| 1-4 (PRACH) | Eth1 | 0.1 | 1 | 0.9 | 2 | 0.1*1 + 0.9*2 = 1.9 | 1 |
| 5-8 (PDxCH) | Eth0 | 0.8 | 2 | 0.2 | 1 | 0.8*2 + 0.2*1 = 1.8 | 1 |
| 5-8 (PDxCH) | Eth1 | 0.8 | 1 | 0.2 | 2 | 0.8*1 + 0.2*2 = 1.2 | 2 |
| 9-12 (PUxCH) | Eth0 | 0.8 | 2 | 0.2 | 1 | 0.8*2 + 0.2*1 = 1.8 | 1 |
| 9-12 (PUxCH) | Eth1 | 0.8 | 1 | 0.2 | 2 | 0.8*1 + 0.2*2 = 1.2 | 2 |
| 13-16 (SRS) | Eth0 | 0.3 | 2 | 0.7 | 1 | 0.3*2 + 0.7*1 = 1.3 | 2 |
| 13-16 (SRS) | Eth1 | 0.3 | 1 | 0.7 | 2 | 0.3*1 + 0.7*2 = 1.7 | 1 | capabilities that can be performed by the system 900, according to some implementations of the current subject matter.

As shown in FIG. 9a, the system 900 can include a DU 902 and an RU 904. The DU 902 can be configured to transmit a request to RU 904 to determine RU's capabilities, at 912 as shown in FIG. 9b. In particular, the request can be As shown in Table 2, the 16 antenna eAxC IDs can be split between PRACH (e.g., eAxC ID 1-4), PDxCH (e.g., eAxC ID 5-8), PUxCH (e.g., eAxC ID 9-12), and SRS (e.g., eAxC ID 13-16). Each can have use of Ethernet ports 0 or 1 (e.g., Eth0 and Eth1). As can be understood, there can be any number of ports, antennas, etc. and Table 2 is provided here for illustrative, non-limiting, exemplary purposes only. As shown in Table 2, a delay weight factor (e.g., 0.1, 0.8, 0.3, etc.) and corresponding delay link priorities (e.g., 1, 2, etc.) can be assigned for each link. The Ethernet port where least delay is measured can be assigned the highest priority. The system can use a scale of 1 to N, where N can be a maximum number of Ethernet ports available (Table 2 shows only 2 for illustrative purposes only). Further, if a policy is implemented, a policy weight factor (e.g., 0.9, 0.2, 0.7) and a corresponding policy priority (e.g., 1, 2) can be assigned for each link as well. The sum of weight factors (i.e., The rank is then determined using the weighted priority equation using the delay and policy weight factors above can be equal to 1.

In some implementations, the weight and/or priority for each link can be assigned based on one or more network policies and/or configurations. These may also be deployment-specific. Based on a particular deployment, a network operator may be informed which link can have a higher weight. For example, assuming two links, one of which is a dark fiber link that can provide consistent guarantee for bandwidth, and another link is a lite fiber link, the operator, using a particular configuration, can assign a larger weight for the dark fiber link as that link is known for its greater bandwidth and/or deterministic latency.

As shown in Table 2, a higher priority value for a particular link can mean that during communications, the link will be treated with the highest priority. Using Table 2, for each group of eAXc IDs, for each Ethernet port, the DU 902 can determine the weighted priority and rank the Ethernet ports using the calculated weighted priority. The DU 902 can assign a higher rank to links with weighted priority having a higher value (i.e., lower numerical value in rank column means higher rank) and can select the Ethernet link (connected to the Ethernet port) to use for that particular eAxC ID.

Once the DU 902 identifies the priority link for each eAxC ID and a data transmission direction (e.g., uplink/downlink), the DU 902 can use that link for transmission of control plane and/or user plane messages for that respective eAxC ID, at 1010, as shown in FIG. 10. The RU 904 can receive the control plane and/or user plane messages from the DU 902 for each eAxC ID on any link and/or port. When the RU 904 receives control plane message traffic for a particular eAxC ID on a particular Ethernet port, it can also expect to receive the downlink user plane traffic for that eAxC ID on the same Ethernet port. Similarly, the RU 904 can switch the uplink user plane traffic for that eAxC ID to the determined Ethernet port (i.e., on which DU transmitted control plane messages).

Figure 11:
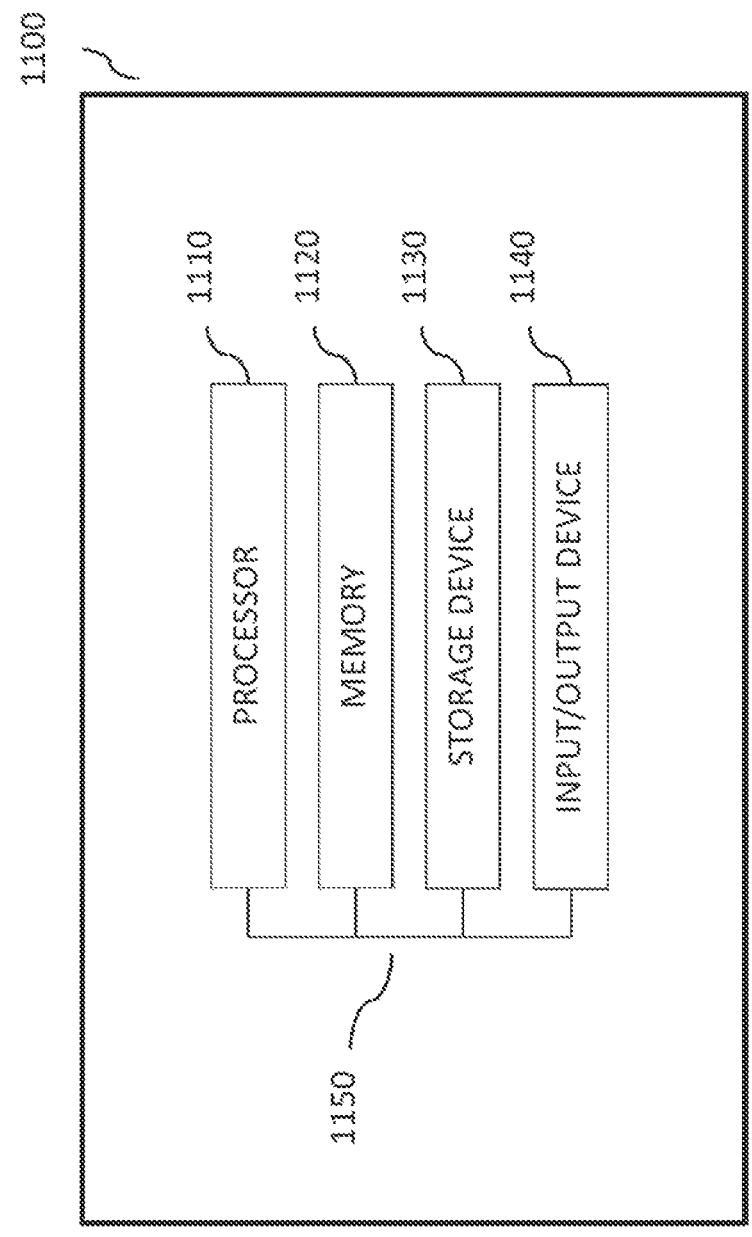
FIG. 11 illustrates an exemplary system, according to some implementations of the current subject matter.

In some implementations, the current subject matter can be configured to be implemented in a system 1100, as shown in FIG. 11. The system 1100 can include one or more of a processor 1110, a memory 1120, a storage device 1130, and an input/output device 1140. Each of the components 1110, 1120, 1130 and 1140 can be interconnected using a system bus 1150. The processor 1110 can be configured to process instructions for execution within the system 600. In some implementations, the processor 1110 can be a single-threaded processor. In alternate implementations, the processor 1110 can be a multi-threaded processor. The processor 1110 can be further configured to process instructions stored in the memory 1120 or on the storage device 1130, including receiving or sending information through the input/output device 1140. The memory 1120 can store information within the system 1100. In some implementations, the memory 1120 can be a computer-readable medium. In alternate implementations, the memory 1120 can be a volatile memory unit. In yet some implementations, the memory 1120 can be a non-volatile memory unit. The storage device 1130 can be capable of providing mass storage for the system 1100. In some implementations, the storage device 1130 can be a computer-readable medium. In alternate implementations, the storage device 1130 can be a floppy disk device, a hard disk device, an optical disk device, a tape device, non-volatile solid state memory, or any other type of storage device. The input/output device 1140 can be configured to provide input/output operations for the system 1100. In some implementations, the input/output device 1140 can include a keyboard and/or pointing device. In alternate implementations, the input/output device 1140 can include a display unit for displaying graphical user interfaces.

FIG. 12 illustrates an exemplary method 1200, according to some implementations of the current subject matter. The process 1200 can be performed by the system 900 shown in FIG. 9.

At 1202, one or more link delays can be determined. The link delays can be associated with one or more communication links in the plurality of communication links communicatively coupling a first communication device (e.g., distributed unit (DU)) and a second communication device (e.g., a radio interface unit (RU)). At 1204, using determined link delays, a communication link transmission priority of the communication links can be determined for the purposes of transmission of one or more data packets. A listing of prioritized communication links can be generated (e.g., as shown by Table 2 above).

At 1206, at least one communication link in the prioritized communication links listing can be selected for transmission of data packets between the first communication device and the second communication device. At 1208, the data packets can be transmitted between the first communication device and the second communication device using the selected communication link.

In some implementations, the current subject matter can include one or more of the following optional features. At least one of the determining, the determining the communication link transmission priority, the selecting, and the transmitting can be performed by a base station. The base station can include at least one of the following communication components: radio interface units and distributed units. The distributed units can be configured to interface with the radio interface units for the transmitting of the data packets.

In some implementations, the first communication device can include a distributed unit, and the second communication device can include a radio interface unit. The link delays can include at least one of the following: at least one first link delay associated with a transmission of data packets from the distributed unit to the radio interface unit, at least one second link delay associated with a transmission of data packets from the radio interface unit to the distributed unit, and any combination thereof. A downlink path delay of each available link can be measured by the distributed unit. An uplink path delay of each available link can be measured by the radio interface unit. One or more timestamps associated with an uplink path can be provided to the distributed unit to determine the uplink path delay as the measured uplink path. In some implementations, the method can include determining a delay sensitivity associated with transmission of data packets on the communication links. The delay sensitivity can be determined based on at least one of the downlink path and uplink path delays not exceeding at least one predetermined delay threshold. The communication link transmission priority can be determined using at least one of the downlink path and uplink path delays and the determined delay sensitivity.

In some implementations, the determining the communication link transmission priority can include assigning one or more weight factors (e.g., as shown in Table 2) to at least one of the downlink path and uplink path delays and the determined delay sensitivity. The generating of the listing can include generating, using the assigned weight factors, a weighted listing of prioritized communication links.

In some implementations, the method can include receiving, by the second communication device, a control plane message from the first communication device on the selected communication link, and transmitting, by the second communication device, a user plane message to the first communication device on the selected communication link.

In some implementations, the method can include receiving, by the second communication device, a control plane message from the first communication device on the selected communication link, and switching, by the second communication device, from at least another communication link in the plurality of communication links to the selected communication link for transmission of a user plane message from the second communication device to the first communication device.

In some implementations, each link in the plurality of communication links can be associated with an Ethernet port of at least one of the first communication device and the second communication device and identified by an extended antenna carrier identifier.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
  determining one or more link delays, the one or more link delays being associated with one or more communication links of a plurality of communication links communicatively coupling a first communication device and a second communication device;
  determining, using the determined one or more link delays, a communication link transmission priority of the one or more communication links for transmission of one or more data packets;
  selecting at least one communication link from the prioritized one or more communication links for transmission of one or more data packets between the first communication device and the second communication device; and
  transmitting, using the selected at least one communication link, the one or more data packets between the first communication device and the second communication device;
  wherein at least one of the determining the one or more link delays, the determining the communication link transmission priority, the selecting, and the transmitting is performed by a base station; and
  wherein the base station includes at least one of the following communication components: one or more radio units and one or more distributed units,
  wherein the first communication device includes a distributed unit, and the second communication device includes a radio unit,
  wherein the one or more link delays includes at least one of the following: at least one first link delay associated with a transmission of one or more data packets from the distributed unit to the radio unit, at least one second link delay associated with a transmission of one or more data packets from the radio unit to the distributed unit, and any combination thereof,
  wherein a downlink path delay of each available link is measured by the distributed unit, wherein an uplink path delay of each available link is measured by the radio unit, wherein one or more timestamps associated with an uplink path are provided to the distributed unit to determine the uplink path delay as the measured uplink path, and
  wherein the method further comprises determining a delay sensitivity associated with transmission of one or more data packets on the one or more communication links, wherein the delay sensitivity is determined based on at least one of the downlink path and uplink path delays not exceeding at least one predetermined delay threshold.

2. The method according to claim 1, wherein the one or more distributed units is configured to interface with the one or more radio units for the transmitting of the one or more data packets.

3. The method according to claim 1, wherein the communication link transmission priority is determined using at least one of the downlink path and uplink path delays and the determined delay sensitivity.

4. The method according to claim 3, wherein the determining the communication link transmission priority further comprises assigning one or more weight factors to each of the downlink path's and uplink path's delays and the determined delay sensitivity, wherein the generating includes generating, using the assigned weight factors, a weighted listing of prioritized one or more communication links.

5. The method according to claim 1, further comprising
  receiving, by the second communication device, a control plane message from the first communication device on the selected at least one communication link; and
  transmitting, by the second communication device, a user plane message to the first communication device on the selected at least one communication link.

6. The method according to claim 1, further comprising
  receiving, by the second communication device, a control plane message from the first communication device on the selected at least one communication link; and
  switching, by the second communication device, from at least another communication link in the plurality of communication links to the selected at least one communication link for transmission of a user plane message from the second communication device to the first communication device.

7. The method according to claim 1, wherein each link in the plurality of communication links is associated with an Ethernet port of at least one of the first communication device and the second communication device and identified by an extended antenna carrier identifier.

8. A computer-implemented method, comprising:
  determining one or more link delays, the one or more link delays being associated with one or more communication links of a plurality of communication links communicatively coupling a first communication device and a second communication device;
  assigning data flow identifiers to the one or more communication links, the data flow identifiers being associated with transmission priority;
  selecting at least one communication link from the one or more communication links assigned with data flow identifiers for transmission of one or more data packets between the first communication device and the second communication device; and
  transmitting, using the selected at least one communication link, the one or more data packets between the first communication device and the second communication device;

wherein the data flow identifiers are dynamically associated to the one or more communication links based on the one or more link delays;

wherein at least one of the determining the one or more link delays, the assigning the data flow identifiers, the selecting, and the transmitting is performed by a base station; and wherein the base station includes at least one of the following communication components: one or more radio units and one or more distributed units, wherein the first communication device includes a distributed unit, and the second communication device includes a radio unit, wherein the one or more link delays includes at least one of the following: at least one first link delay associated with a transmission of one or more data packets from the distributed unit to the radio unit, at least one second link delay associated with a transmission of one or more data packets from the radio unit to the distributed unit, and any combination thereof, wherein a downlink path delay of each available link is measured by the distributed unit, wherein an uplink path delay of each available link is measured by the radio unit, wherein one or more timestamps associated with an uplink path are provided to the distributed unit to determine the uplink path delay as the measured uplink path, and wherein the method further comprises determining a delay sensitivity associated with transmission of one or more data packets on the one or more communication links, wherein the delay sensitivity is determined based on at least one of the downlink path and uplink path delays not exceeding at least one predetermined delay threshold.

9. The method according to 8, the data flow identifiers are Extended Antenna Carrier identifiers (eAxC ID).

10. The method according to 8, transmission of one or more data packets between the first communication device and the second communication device is switched according to the data flow identifiers assigned to the one or more communication links.

* * * * *